(12) United States Patent
Maheshwari

(10) Patent No.: US 6,829,077 B1
(45) Date of Patent: Dec. 7, 2004

(54) DIFFRACTIVE LIGHT MODULATOR WITH DYNAMICALLY ROTATABLE DIFFRACTION PLANE

(75) Inventor: Dinesh Maheshwari, Fremont, CA (US)

(73) Assignee: Silicon Light Machines, Inc., Sunnyvale, CA (US)

( * ) Notice: Subject to any disclaimer, the term of this patent is extended or adjusted under 35 U.S.C. 154(b) by 2 days.

(21) Appl. No.: 10/377,936

(22) Filed: Feb. 28, 2003

(51) Int. Cl.$^7$ .................. G02B 26/00; G02B 26/08; G02B 5/18

(52) U.S. Cl. .............. 359/291; 359/290; 359/295; 359/298; 359/224; 359/572; 359/237

(58) Field of Search ................. 359/290, 291, 359/295, 298, 224, 318, 572, 573, 237

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |
| 2,415,226 A | 2/1947 | Sziklai |
| 2,783,406 A | 2/1957 | Vanderhooft |
| 2,920,529 A | 1/1960 | Blythe |
| 2,991,690 A | 7/1961 | Grey et al. |
| RE25,169 E | 5/1962 | Glenn |
| 3,256,465 A | 6/1966 | Weissenstern et al. |
| 3,388,301 A | 6/1968 | James |
| 3,443,871 A | 5/1969 | Chitayat |
| 3,553,364 A | 1/1971 | Lee |
| 3,576,394 A | 4/1971 | Lee |
| 3,600,798 A | 8/1971 | Lee |
| 3,656,837 A | 4/1972 | Sandbank |
| 3,657,610 A | 4/1972 | Yamamoto et al. |
| 3,693,239 A | 9/1972 | Dix |
| 3,743,507 A | 7/1973 | Ih et al. |
| 3,752,563 A | 8/1973 | Torok et al. |
| 3,781,465 A | 12/1973 | Ernstoff et al. |
| 3,783,184 A | 1/1974 | Ernstoff et al. |

(List continued on next page.)

FOREIGN PATENT DOCUMENTS

| | | | |
|---|---|---|---|
| DE | 32 33 195 A1 | 3/1983 | ............ H01L/23/52 |
| DE | 43 23 799 A1 | 1/1994 | ............ H01L/23/50 |
| DE | 197 23 618 A1 | 12/1997 | ............. G03F/1/14 |

(List continued on next page.)

OTHER PUBLICATIONS

R. Apte, "Grating Light Valves for High Resolution Displays", Solid State Sensors and Actuators Workshop, Ph D. Dissertation, Stanford University (Jun. 1994).

(List continued on next page.)

Primary Examiner—Georgia Epps
Assistant Examiner—Jack Dinh
(74) Attorney, Agent, or Firm—Okamoto & Benedicto LLP

(57) ABSTRACT

A light modulator includes elongated elements and a support structure. The elongated elements are arranged in parallel. Each element includes a light reflective planar surface with the light reflective planar surfaces lying in one or more parallel planes. The support structure is coupled to the elongated elements to maintain a position of the elongated elements relative to each other and to enable movement of each elongated element between a first modulator configuration and a second modulator configuration. In the first modulator configuration, the elongated elements act to reflect an incident light as a plane mirror. In the second modulator configuration, selected groups of elements are deflected and act to diffract the incident light along one or more of a plurality of diffraction planes. The groups of elements are configured according to one of a plurality of selectable group configurations. Each group configuration corresponds to one of the plurality of diffraction planes.

20 Claims, 9 Drawing Sheets

U.S. PATENT DOCUMENTS

| | | |
|---|---|---|
| 3,792,916 A | 2/1974 | Sama |
| 3,802,769 A | 4/1974 | Rotz et al. |
| 3,811,186 A | 5/1974 | Larnerd et al. |
| 3,861,784 A | 1/1975 | Torok |
| 3,862,360 A | 1/1975 | Dill et al. |
| 3,871,014 A | 3/1975 | King et al. |
| 3,886,310 A | 5/1975 | Guldberg et al. |
| 3,896,338 A | 7/1975 | Nathanson et al. |
| 3,915,548 A | 10/1975 | Opittek |
| 3,935,499 A | 1/1976 | Oess |
| 3,935,500 A | 1/1976 | Oess et al. |
| 3,938,881 A | 2/1976 | Biegelsen et al. |
| 3,941,456 A | 3/1976 | Schilz et al. |
| 3,942,245 A | 3/1976 | Jackson et al. |
| 3,943,281 A | 3/1976 | Keller et al. |
| 3,947,105 A | 3/1976 | Smith |
| 3,969,611 A | 7/1976 | Fonteneau |
| 3,980,476 A | 9/1976 | Wysocki |
| 3,991,416 A | 11/1976 | Byles et al. |
| 4,001,663 A | 1/1977 | Bray |
| 4,004,849 A | 1/1977 | Shattuck |
| 4,006,968 A | 2/1977 | Ernstoff et al. |
| 4,009,473 A | 2/1977 | Burns |
| 4,009,939 A | 3/1977 | Okano |
| 4,011,009 A | 3/1977 | Lama et al. |
| 4,012,116 A | 3/1977 | Yevick |
| 4,012,835 A | 3/1977 | Wallick |
| 4,017,158 A | 4/1977 | Booth |
| 4,020,381 A | 4/1977 | Oess et al. |
| 4,021,766 A | 5/1977 | Aine |
| 4,034,211 A | 7/1977 | Horst et al. |
| 4,414,583 A | 11/1983 | Hooker, III |
| 4,417,386 A | 11/1983 | Exner |
| 4,418,397 A | 11/1983 | Brantingham et al. |
| 4,420,717 A | 12/1983 | Wallace et al. |
| 4,422,099 A | 12/1983 | Wolfe |
| 4,426,768 A | 1/1984 | Black et al. |
| 4,430,584 A | 2/1984 | Someshwar et al. |
| 4,435,041 A | 3/1984 | Torok et al. |
| 4,440,839 A | 4/1984 | Mottier |
| 4,443,819 A | 4/1984 | Funada et al. |
| 4,443,845 A | 4/1984 | Hamilton et al. |
| 4,447,881 A | 5/1984 | Brantingham et al. |
| 4,454,591 A | 6/1984 | Lou |
| 4,456,338 A | 6/1984 | Gelbart |
| 4,460,907 A | 7/1984 | Nelson |
| 4,462,046 A | 7/1984 | Spight |
| 4,467,342 A | 8/1984 | Tower |
| 4,468,725 A | 8/1984 | Venturini |
| 4,483,596 A | 11/1984 | Marshall |
| 4,484,188 A | 11/1984 | Ott |
| 4,487,677 A | 12/1984 | Murphy |
| 4,492,435 A | 1/1985 | Banton et al. |
| 4,503,494 A | 3/1985 | Hamilton et al. |
| 4,511,220 A | 4/1985 | Scully |
| 4,538,883 A | 9/1985 | Sprague et al. |
| 4,545,610 A | 10/1985 | Lakritz et al. |
| 4,556,378 A | 12/1985 | Nyfeler et al. |
| 4,558,171 A | 12/1985 | Gantley et al. |
| 4,561,044 A | 12/1985 | Ogura et al. |
| 4,566,935 A | 1/1986 | Hornbeck |
| 4,567,585 A | 1/1986 | Gelbart |
| 4,571,041 A | 2/1986 | Gaudyn |
| 4,571,603 A | 2/1986 | Hornbeck et al. |
| 4,577,932 A | 3/1986 | Gelbart |
| 4,577,933 A | 3/1986 | Yip et al. |
| 4,588,957 A | 5/1986 | Balant et al. |
| 4,590,548 A | 5/1986 | Maytum |
| 4,594,501 A | 6/1986 | Culley et al. |
| 4,596,992 A | 6/1986 | Hornbeck |
| 4,615,595 A | 10/1986 | Hornbeck |
| 4,623,219 A | 11/1986 | Trias |
| 4,636,039 A | 1/1987 | Turner |
| 4,636,866 A | 1/1987 | Hattori |
| 4,641,193 A | 2/1987 | Glenn |
| 4,645,881 A | 2/1987 | LeToumelin et al. |
| 4,646,158 A | 2/1987 | Ohno et al. |
| 4,649,085 A | 3/1987 | Landram |
| 4,649,432 A | 3/1987 | Watanabe |
| 4,652,932 A | 3/1987 | Miyajima et al. |
| 4,655,539 A | 4/1987 | Caulfield et al. |
| 4,660,938 A | 4/1987 | Kazan |
| 4,661,828 A | 4/1987 | Miller, Jr. et al. |
| 4,662,746 A | 5/1987 | Hornbeck |
| 4,663,670 A | 5/1987 | Ito et al. |
| 4,687,326 A | 8/1987 | Corby, Jr. |
| 4,698,602 A | 10/1987 | Armitage |
| 4,700,276 A | 10/1987 | Freyman et al. |
| 4,707,064 A | 11/1987 | Dobrowolski et al. |
| 4,709,995 A | 12/1987 | Kuribayashi et al. |
| 4,710,732 A | 12/1987 | Hornbeck |
| 4,711,526 A | 12/1987 | Hennings et al. |
| 4,714,326 A | 12/1987 | Usui et al. |
| 4,717,066 A | 1/1988 | Goldenberg et al. |
| 4,719,507 A | 1/1988 | Bos |
| 4,721,629 A | 1/1988 | Sakai et al. |
| 4,722,593 A | 2/1988 | Shimazaki |
| 4,724,467 A | 2/1988 | Yip et al. |
| 4,728,185 A | 3/1988 | Thomas |
| 4,743,091 A | 5/1988 | Gelbart |
| 4,744,633 A | 5/1988 | Sheiman |
| 4,747,671 A | 5/1988 | Takahashi et al. |
| 4,751,509 A | 6/1988 | Kubota et al. |
| 4,761,253 A | 8/1988 | Antes |
| 4,763,975 A | 8/1988 | Scifres et al. |
| 4,765,865 A | 8/1988 | Gealer et al. |
| 4,772,094 A | 9/1988 | Sheiman |
| 4,797,694 A | 1/1989 | Agostinelli et al. |
| 4,797,918 A | 1/1989 | Lee et al. |
| 4,801,194 A | 1/1989 | Agostinelli et al. |
| 4,803,560 A | 2/1989 | Matsunaga et al. |
| 4,804,641 A | 2/1989 | Arlt et al. |
| 4,807,021 A | 2/1989 | Okumura |
| 4,807,965 A | 2/1989 | Garakani |
| 4,809,078 A | 2/1989 | Yabe et al. |
| 4,811,082 A | 3/1989 | Jacobs et al. |
| 4,811,210 A | 3/1989 | McAulay |
| 4,814,759 A | 3/1989 | Gombrich et al. |
| 4,817,850 A | 4/1989 | Wiener-Avnear et al. |
| 4,824,200 A | 4/1989 | Isono et al. |
| 4,827,391 A | 5/1989 | Sills |
| 4,829,365 A | 5/1989 | Eichenlaub |
| 4,836,649 A | 6/1989 | Ledebuhr et al. |
| 4,856,863 A | 8/1989 | Sampsell et al. |
| 4,856,869 A | 8/1989 | Sakata et al. |
| 4,859,012 A | 8/1989 | Cohn |
| 4,859,060 A | 8/1989 | Katagiri et al. |
| 4,866,488 A | 9/1989 | Frensley |
| 4,882,683 A | 11/1989 | Rupp et al. |
| 4,893,509 A | 1/1990 | MacIver et al. |
| 4,896,325 A | 1/1990 | Coldren |
| 4,896,948 A | 1/1990 | Dono et al. |
| 4,897,708 A | 1/1990 | Clements |
| 4,902,083 A | 2/1990 | Wells |
| 4,915,463 A | 4/1990 | Barbee, Jr. |
| 4,915,479 A | 4/1990 | Clarke |
| 4,924,413 A | 5/1990 | Suwannukul |
| 4,926,241 A | 5/1990 | Carey |
| 4,930,043 A | 5/1990 | Wiegand |
| 4,934,773 A | 6/1990 | Becker |
| 4,940,309 A | 7/1990 | Baum |

| | | | | | |
|---|---|---|---|---|---|
| 4,943,815 A | 7/1990 | Aldrich et al. | 5,142,303 A | 8/1992 | Nelson |
| 4,945,773 A | 8/1990 | Sickafus | 5,142,405 A | 8/1992 | Hornbeck |
| 4,949,148 A | 8/1990 | Bartelink | 5,142,677 A | 8/1992 | Ehlig et al. |
| 4,950,890 A | 8/1990 | Gelbart | 5,144,472 A | 9/1992 | Sang, Jr. et al. |
| 4,952,925 A | 8/1990 | Haastert | 5,147,815 A | 9/1992 | Casto |
| 4,954,789 A | 9/1990 | Sampsell | 5,148,157 A | 9/1992 | Florence |
| 4,956,619 A | 9/1990 | Hornbeck | 5,148,506 A | 9/1992 | McDonald |
| 4,961,633 A | 10/1990 | Ibrahim et al. | 5,149,405 A | 9/1992 | Bruns et al. |
| 4,963,012 A | 10/1990 | Tracy et al. | 5,150,205 A | 9/1992 | Um et al. |
| 4,970,575 A | 11/1990 | Soga et al. | 5,151,718 A | 9/1992 | Nelson |
| 4,978,202 A | 12/1990 | Yang | 5,151,724 A | 9/1992 | Kikinis |
| 4,982,184 A | 1/1991 | Kirkwood | 5,151,763 A | 9/1992 | Marek et al. |
| 4,982,265 A | 1/1991 | Watanabe et al. | 5,153,770 A | 10/1992 | Harris |
| 4,984,824 A | 1/1991 | Antes et al. | 5,155,604 A | 10/1992 | Miekka et al. |
| 4,999,308 A | 3/1991 | Nishiura et al. | 5,155,615 A | 10/1992 | Tagawa |
| 5,003,300 A | 3/1991 | Wells | 5,155,778 A | 10/1992 | Magel et al. |
| 5,013,141 A | 5/1991 | Sakata | 5,155,812 A | 10/1992 | Ehlig et al. |
| 5,018,256 A | 5/1991 | Hornbeck | 5,157,304 A | 10/1992 | Kane et al. |
| 5,022,750 A | 6/1991 | Flasck | 5,159,485 A | 10/1992 | Nelson |
| 5,023,905 A | 6/1991 | Wells et al. | 5,161,042 A | 11/1992 | Hamada |
| 5,024,494 A | 6/1991 | Williams et al. | 5,162,787 A | 11/1992 | Thompson et al. |
| 5,028,939 A | 7/1991 | Hornbeck et al. | 5,164,019 A | 11/1992 | Sinton |
| 5,031,144 A | 7/1991 | Persky | 5,165,013 A | 11/1992 | Faris |
| 5,035,473 A | 7/1991 | Kuwayama et al. | 5,168,401 A | 12/1992 | Endriz |
| 5,037,173 A | 8/1991 | Sampsell et al. | 5,168,406 A | 12/1992 | Nelson |
| 5,039,628 A | 8/1991 | Carey | 5,170,156 A | 12/1992 | DeMond et al. |
| 5,040,052 A | 8/1991 | McDavid | 5,170,269 A | 12/1992 | Lin et al. |
| 5,041,395 A | 8/1991 | Steffen | 5,170,283 A | 12/1992 | O'Brien et al. |
| 5,041,851 A | 8/1991 | Nelson | 5,172,161 A | 12/1992 | Nelson |
| 5,043,917 A | 8/1991 | Okamoto | 5,172,262 A | 12/1992 | Hornbeck |
| 5,048,077 A | 9/1991 | Wells et al. | 5,177,724 A | 1/1993 | Gelbart |
| 5,049,901 A | 9/1991 | Gelbart | 5,178,728 A | 1/1993 | Boysel et al. |
| 5,058,992 A | 10/1991 | Takahashi | 5,179,274 A | 1/1993 | Sampsell |
| 5,060,058 A | 10/1991 | Goldenberg et al. | 5,179,367 A | 1/1993 | Shimizu |
| 5,061,049 A | 10/1991 | Hornbeck | 5,181,231 A | 1/1993 | Parikh et al. |
| 5,066,614 A | 11/1991 | Dunaway et al. | 5,182,665 A | 1/1993 | O'Callaghan et al. |
| 5,068,205 A | 11/1991 | Baxter et al. | 5,185,660 A | 2/1993 | Um |
| 5,072,239 A | 12/1991 | Mitcham et al. | 5,185,823 A | 2/1993 | Kaku et al. |
| 5,072,418 A | 12/1991 | Boutaud et al. | 5,188,280 A | 2/1993 | Nakao et al. |
| 5,074,947 A | 12/1991 | Estes et al. | 5,189,404 A | 2/1993 | Masimo et al. |
| 5,075,940 A | 12/1991 | Kuriyama et al. | 5,189,505 A | 2/1993 | Bartelink |
| 5,079,544 A | 1/1992 | DeMond et al. | 5,191,405 A | 3/1993 | Tomita et al. |
| 5,081,617 A | 1/1992 | Gelbart | 5,192,864 A | 3/1993 | McEwen et al. |
| 5,083,857 A | 1/1992 | Hornbeck | 5,192,946 A | 3/1993 | Thompson et al. |
| 5,085,497 A | 2/1992 | Um et al. | 5,198,895 A | 3/1993 | Vick |
| 5,089,903 A | 2/1992 | Kuwayama et al. | D334,557 S | 4/1993 | Hunter et al. ............... D14/114 |
| 5,093,281 A | 3/1992 | Eshima | D334,742 S | 4/1993 | Hunter et al. ............... D14/113 |
| 5,096,279 A | 3/1992 | Hornbeck et al. | 5,202,785 A | 4/1993 | Nelson |
| 5,099,353 A | 3/1992 | Hornbeck | 5,206,629 A | 4/1993 | DeMond et al. |
| 5,101,184 A | 3/1992 | Antes | 5,206,829 A | 4/1993 | Thakoor et al. |
| 5,101,236 A | 3/1992 | Nelson et al. | 5,208,818 A | 5/1993 | Gelbart et al. |
| 5,103,334 A | 4/1992 | Swanberg | 5,208,891 A | 5/1993 | Prysner |
| 5,105,207 A | 4/1992 | Nelson | 5,210,637 A | 5/1993 | Puzey |
| 5,105,299 A | 4/1992 | Anderson et al. | 5,212,115 A | 5/1993 | Cho et al. |
| 5,105,369 A | 4/1992 | Nelson | 5,212,555 A | 5/1993 | Stoltz |
| 5,107,372 A | 4/1992 | Gelbart et al. | 5,212,582 A | 5/1993 | Nelson |
| 5,112,436 A | 5/1992 | Bol | 5,214,308 A | 5/1993 | Nishiguchi et al. |
| 5,113,272 A | 5/1992 | Reamey | 5,214,419 A | 5/1993 | DeMond et al. |
| 5,113,285 A | 5/1992 | Franklin et al. | 5,214,420 A | 5/1993 | Thompson et al. |
| 5,115,344 A | 5/1992 | Jaskie | 5,216,537 A | 6/1993 | Hornbeck |
| 5,119,204 A | 6/1992 | Hashimoto et al. | 5,216,544 A | 6/1993 | Horikawa et al. |
| 5,121,343 A | 6/1992 | Faris | 5,219,794 A | 6/1993 | Satoh et al. |
| 5,126,812 A | 6/1992 | Greiff | 5,220,200 A | 6/1993 | Blanton |
| 5,126,826 A | 6/1992 | Kauchi et al. | 5,221,400 A | 6/1993 | Staller et al. |
| 5,126,836 A | 6/1992 | Um | 5,221,982 A | 6/1993 | Faris |
| 5,128,660 A | 7/1992 | DeMond et al. | 5,224,088 A | 6/1993 | Atiya |
| 5,129,716 A | 7/1992 | Holakovszky et al. | D337,320 S | 7/1993 | Hunter et al. ............... D14/113 |
| 5,132,723 A | 7/1992 | Gelbart | 5,226,099 A | 7/1993 | Mignardi et al. |
| 5,132,812 A | 7/1992 | Takahashi et al. | 5,229,597 A | 7/1993 | Fukatsu |
| 5,136,695 A | 8/1992 | Goldshlag et al. | 5,230,005 A | 7/1993 | Rubino et al. |
| 5,137,836 A | 8/1992 | Lam | 5,231,363 A | 7/1993 | Sano et al. |

| | | | | | |
|---|---|---|---|---|---|
| 5,231,388 A | 7/1993 | Stoltz | 5,330,878 A | 7/1994 | Nelson |
| 5,231,432 A | 7/1993 | Glenn | 5,331,454 A | 7/1994 | Hornbeck |
| 5,233,456 A | 8/1993 | Nelson | 5,334,991 A | 8/1994 | Wells et al. |
| 5,233,460 A | 8/1993 | Partlo et al. | 5,339,116 A | 8/1994 | Urbanus et al. |
| 5,233,874 A | 8/1993 | Putty et al. | 5,339,177 A | 8/1994 | Jenkins et al. |
| 5,237,340 A | 8/1993 | Nelson | 5,340,772 A | 8/1994 | Rosotker |
| 5,237,435 A | 8/1993 | Kurematsu et al. | 5,345,521 A | 9/1994 | McDonald et al. |
| 5,239,448 A | 8/1993 | Perkins et al. | 5,347,321 A | 9/1994 | Gove |
| 5,239,806 A | 8/1993 | Maslakow | 5,347,378 A | 9/1994 | Handschy et al. |
| 5,240,818 A | 8/1993 | Mignardi et al. | 5,347,433 A | 9/1994 | Sedlmayr |
| 5,245,686 A | 9/1993 | Faris et al. | 5,348,619 A | 9/1994 | Bohannon et al. |
| 5,247,180 A | 9/1993 | Mitcham et al. | 5,349,687 A | 9/1994 | Ehlig et al. |
| 5,247,593 A | 9/1993 | Lin et al. | 5,351,052 A | 9/1994 | D'Hont et al. |
| 5,249,245 A | 9/1993 | Lebby et al. | 5,352,926 A | 10/1994 | Andrews |
| 5,251,057 A | 10/1993 | Guerin et al. | 5,354,416 A | 10/1994 | Okudaira |
| 5,251,058 A | 10/1993 | MacArthur | 5,357,369 A | 10/1994 | Pilling et al. |
| 5,254,980 A | 10/1993 | Hendrix et al. | 5,357,803 A | 10/1994 | Lane |
| 5,255,100 A | 10/1993 | Urbanus | 5,359,349 A | 10/1994 | Jambor et al. |
| 5,256,869 A | 10/1993 | Lin et al. | 5,359,451 A | 10/1994 | Gelbart et al. |
| 5,258,325 A | 11/1993 | Spitzer et al. | 5,361,131 A | 11/1994 | Tekemori et al. |
| 5,260,718 A | 11/1993 | Rommelmann et al. | 5,363,220 A | 11/1994 | Kuwayama et al. |
| 5,260,798 A | 11/1993 | Um et al. | 5,365,283 A | 11/1994 | Doherty et al. |
| 5,262,000 A | 11/1993 | Welbourn et al. | 5,367,585 A | 11/1994 | Ghezzo et al. |
| 5,272,473 A | 12/1993 | Thompson et al. | 5,370,742 A | 12/1994 | Mitchell et al. |
| 5,278,652 A | 1/1994 | Urbanus et al. | 5,371,543 A | 12/1994 | Anderson |
| 5,278,925 A | 1/1994 | Boysel et al. | 5,371,618 A | 12/1994 | Tai et al. |
| 5,280,277 A | 1/1994 | Hornbeck | 5,377,705 A | 1/1995 | Smith, Jr. et al. |
| 5,281,887 A | 1/1994 | Engle | 5,382,961 A | 1/1995 | Gale, Jr. |
| 5,281,957 A | 1/1994 | Schoolman | 5,387,924 A | 2/1995 | Gale, Jr. et al. |
| 5,285,105 A | 2/1994 | Cain | 5,389,182 A | 2/1995 | Mignardi |
| 5,285,196 A | 2/1994 | Gale, Jr. | 5,391,881 A | 2/1995 | Jeuch et al. |
| 5,285,407 A | 2/1994 | Gale et al. | 5,392,140 A | 2/1995 | Ezra et al. |
| 5,287,096 A | 2/1994 | Thompson et al. | 5,392,151 A | 2/1995 | Nelson |
| 5,287,215 A | 2/1994 | Warde et al. | 5,394,303 A | 2/1995 | Yamaji |
| 5,289,172 A | 2/1994 | Gale, Jr. et al. | 5,398,071 A | 3/1995 | Gove et al. |
| 5,291,317 A | 3/1994 | Newswanger | 5,399,898 A | 3/1995 | Rostoker |
| 5,291,473 A | 3/1994 | Pauli | 5,404,365 A | 4/1995 | Hiiro |
| 5,293,511 A | 3/1994 | Poradish et al. | 5,404,485 A | 4/1995 | Ban |
| 5,296,408 A | 3/1994 | Wilbarg et al. | 5,408,123 A | 4/1995 | Murai |
| 5,296,891 A | 3/1994 | Vogt et al. | 5,410,315 A | 4/1995 | Huber |
| 5,296,950 A | 3/1994 | Lin et al. | 5,411,769 A | 5/1995 | Hornbeck |
| 5,298,460 A | 3/1994 | Nishiguchi et al. | 5,412,186 A | 5/1995 | Gale |
| 5,299,037 A | 3/1994 | Sakata | 5,412,501 A | 5/1995 | Fisli |
| 5,299,289 A | 3/1994 | Omae et al. | 5,418,584 A | 5/1995 | Larson |
| 5,300,813 A | 4/1994 | Joshi et al. | 5,420,655 A | 5/1995 | Shimizu |
| 5,301,062 A | 4/1994 | Takahashi et al. | 5,420,722 A | 5/1995 | Bielak |
| 5,303,043 A | 4/1994 | Glenn | 5,426,072 A | 6/1995 | Finnila |
| 5,303,055 A | 4/1994 | Hendrix et al. | 5,427,975 A | 6/1995 | Sparks et al. |
| 5,307,056 A | 4/1994 | Urbanus | 5,430,524 A | 7/1995 | Nelson |
| 5,307,185 A | 4/1994 | Jones et al. | 5,435,876 A | 7/1995 | Alfaro et al. |
| 5,310,624 A | 5/1994 | Ehrlich | 5,438,477 A | 8/1995 | Pasch |
| 5,311,349 A | 5/1994 | Anderson et al. | 5,439,731 A | 8/1995 | Li et al. |
| 5,311,360 A | 5/1994 | Bloom et al. | 5,442,411 A | 8/1995 | Urbanus et al. |
| 5,312,513 A | 5/1994 | Florence et al. | 5,442,414 A | 8/1995 | Janssen et al. |
| 5,313,479 A | 5/1994 | Florence | 5,444,566 A | 8/1995 | Gale et al. |
| 5,313,648 A | 5/1994 | Ehlig et al. | 5,445,559 A | 8/1995 | Gale et al. |
| 5,313,835 A | 5/1994 | Dunn | 5,446,479 A | 8/1995 | Thompson et al. |
| 5,315,418 A | 5/1994 | Sprague et al. | 5,447,600 A | 9/1995 | Webb |
| 5,315,423 A | 5/1994 | Hong | 5,448,314 A | 9/1995 | Heimbuch et al. |
| 5,315,429 A | 5/1994 | Abramov | 5,448,546 A | 9/1995 | Pauli |
| 5,319,214 A | 6/1994 | Gregory et al. | 5,450,088 A | 9/1995 | Meier et al. |
| 5,319,668 A | 6/1994 | Luecke | 5,450,219 A | 9/1995 | Gold et al. |
| 5,319,789 A | 6/1994 | Ehlig et al. | 5,451,103 A | 9/1995 | Hatanaka et al. |
| 5,319,792 A | 6/1994 | Ehlig et al. | 5,452,024 A | 9/1995 | Sampsell |
| 5,321,416 A | 6/1994 | Bassett et al. | 5,452,138 A | 9/1995 | Mignardi et al. |
| 5,323,002 A | 6/1994 | Sampsell et al. | 5,453,747 A | 9/1995 | D'Hont et al. |
| 5,323,051 A | 6/1994 | Adams et al. | 5,453,778 A | 9/1995 | Venkateswar et al. |
| 5,325,116 A | 6/1994 | Sampsell | 5,453,803 A | 9/1995 | Shapiro et al. |
| 5,327,286 A | 7/1994 | Sampsell et al. | 5,454,160 A | 10/1995 | Nickel |
| 5,329,289 A | 7/1994 | Sakamoto et al. | 5,454,906 A | 10/1995 | Baker et al. |
| 5,330,301 A | 7/1994 | Brancher | 5,455,445 A | 10/1995 | Kurtz et al. |

| | | | | | |
|---|---|---|---|---|---|
| 5,455,455 A | 10/1995 | Badehi | 5,517,347 A | 5/1996 | Sampsell |
| 5,455,602 A | 10/1995 | Tew | 5,517,357 A | 5/1996 | Shibayama |
| 5,457,493 A | 10/1995 | Leddy et al. | 5,517,359 A | 5/1996 | Gelbart |
| 5,457,566 A | 10/1995 | Sampsell et al. | 5,519,251 A | 5/1996 | Sato et al. |
| 5,457,567 A | 10/1995 | Shinohara | 5,519,450 A | 5/1996 | Urbanus et al. |
| 5,458,716 A | 10/1995 | Alfaro et al. | 5,521,748 A | 5/1996 | Sarraf |
| 5,459,492 A | 10/1995 | Venkateswar | 5,523,619 A | 6/1996 | McAllister et al. |
| 5,459,528 A | 10/1995 | Pettitt | 5,523,628 A | 6/1996 | Williams et al. |
| 5,459,592 A | 10/1995 | Shibatani et al. | 5,523,803 A | 6/1996 | Urbanus et al. |
| 5,459,610 A | 10/1995 | Bloom et al. | 5,523,878 A | 6/1996 | Wallace et al. |
| 5,461,197 A | 10/1995 | Hiruta et al. | 5,523,881 A | 6/1996 | Florence et al. |
| 5,461,410 A | 10/1995 | Venkateswar et al. | 5,523,920 A | 6/1996 | Machuga et al. |
| 5,461,411 A | 10/1995 | Florence et al. | 5,524,155 A | 6/1996 | Weaver |
| 5,461,547 A | 10/1995 | Ciupke et al. | 5,526,834 A | 6/1996 | Mielnik et al. |
| 5,463,347 A | 10/1995 | Jones et al. | 5,534,107 A | 7/1996 | Gray et al. |
| 5,463,497 A | 10/1995 | Muraki et al. | 5,534,883 A | 7/1996 | Koh |
| 5,465,175 A | 11/1995 | Woodgate et al. | 5,539,422 A | 7/1996 | Heacock et al. |
| 5,467,106 A | 11/1995 | Salomon | 5,544,306 A | 8/1996 | Deering et al. |
| 5,467,138 A | 11/1995 | Gove | 5,554,304 A | 9/1996 | Suzuki |
| 5,467,146 A | 11/1995 | Huang et al. | 5,576,878 A | 11/1996 | Henck |
| 5,469,302 A | 11/1995 | Lim | 5,602,671 A | 2/1997 | Hornbeck |
| 5,471,341 A | 11/1995 | Warde et al. | 5,606,181 A | 2/1997 | Sakuma et al. |
| 5,473,512 A | 12/1995 | Degani et al. | 5,606,447 A | 2/1997 | Asada et al. |
| 5,475,236 A | 12/1995 | Yoshizaki | 5,610,438 A | 3/1997 | Wallace et al. |
| 5,480,839 A | 1/1996 | Ezawa et al. | 5,623,361 A | 4/1997 | Engle |
| 5,481,118 A | 1/1996 | Tew | 5,629,566 A | 5/1997 | Doi et al. |
| 5,481,133 A | 1/1996 | Hsu | 5,629,801 A | 5/1997 | Staker et al. |
| 5,482,564 A | 1/1996 | Douglas et al. | 5,640,216 A | 6/1997 | Hasegawa et al. |
| 5,482,818 A | 1/1996 | Nelson | 5,658,698 A | 8/1997 | Yagi et al. |
| 5,483,307 A | 1/1996 | Anderson | 5,661,592 A | 8/1997 | Bornstein et al. |
| 5,485,172 A | 1/1996 | Sawachika et al. | 5,661,593 A | 8/1997 | Engle |
| 5,485,304 A | 1/1996 | Kaeriyama | 5,663,817 A | 9/1997 | Frapin et al. |
| 5,485,354 A | 1/1996 | Ciupke et al. | 5,668,611 A | 9/1997 | Ernstoff et al. |
| 5,486,698 A | 1/1996 | Hanson et al. | 5,673,139 A | 9/1997 | Johnson |
| 5,486,841 A | 1/1996 | Hara et al. | 5,677,783 A | 10/1997 | Bloom et al. |
| 5,486,946 A | 1/1996 | Jachimowicz et al. | 5,689,361 A | 11/1997 | Damen et al. |
| 5,488,431 A | 1/1996 | Gove et al. | 5,691,836 A | 11/1997 | Clark |
| 5,489,952 A | 2/1996 | Gove et al. | 5,694,740 A | 12/1997 | Martin et al. |
| 5,490,009 A | 2/1996 | Venkateswar et al. | 5,696,560 A | 12/1997 | Songer |
| 5,491,510 A | 2/1996 | Gove | 5,699,740 A | 12/1997 | Gelbart |
| 5,491,612 A | 2/1996 | Nicewarner, Jr. | 5,704,700 A | 1/1998 | Kappel et al. |
| 5,491,715 A | 2/1996 | Flaxl | 5,707,160 A | 1/1998 | Bowen |
| 5,493,177 A | 2/1996 | Muller et al. | 5,712,649 A | 1/1998 | Tosaki |
| 5,493,439 A | 2/1996 | Engle | 5,713,652 A | 2/1998 | Zavracky et al. |
| 5,497,172 A | 3/1996 | Doherty et al. | 5,726,480 A | 3/1998 | Pister |
| 5,497,197 A | 3/1996 | Gove et al. | 5,731,802 A | 3/1998 | Aras et al. |
| 5,497,262 A | 3/1996 | Kaeriyama | 5,734,224 A | 3/1998 | Tagawa et al. |
| 5,499,060 A | 3/1996 | Gove et al. | 5,742,373 A | 4/1998 | Alvelda |
| 5,499,062 A | 3/1996 | Urbanus | 5,744,752 A | 4/1998 | McHerron et al. |
| 5,500,761 A | 3/1996 | Goossen et al. | 5,745,271 A | 4/1998 | Ford et al. |
| 5,502,481 A | 3/1996 | Dentinger et al. | 5,757,354 A | 5/1998 | Kawamura |
| 5,504,504 A | 4/1996 | Markandey et al. | 5,757,536 A | 5/1998 | Ricco et al. |
| 5,504,514 A | 4/1996 | Nelson | 5,764,280 A | 6/1998 | Bloom et al. |
| 5,504,575 A | 4/1996 | Stafford | 5,768,009 A | 6/1998 | Little |
| 5,504,614 A | 4/1996 | Webb et al. | 5,770,473 A | 6/1998 | Hall et al. |
| 5,506,171 A | 4/1996 | Leonard et al. | 5,793,519 A | 8/1998 | Furlani et al. |
| 5,506,597 A | 4/1996 | Thompson et al. | 5,798,743 A | 8/1998 | Bloom |
| 5,506,720 A | 4/1996 | Yoon | 5,798,805 A | 8/1998 | Ooi et al. |
| 5,508,558 A | 4/1996 | Robinette, Jr. et al. | 5,801,074 A | 9/1998 | Kim et al. |
| 5,508,561 A | 4/1996 | Tago et al. | 5,802,222 A | 9/1998 | Rasch et al. |
| 5,508,565 A | 4/1996 | Hatakeyama et al. | 5,808,323 A | 9/1998 | Spaeth et al. |
| 5,508,750 A | 4/1996 | Hewlett et al. | 5,808,797 A | 9/1998 | Bloom et al. |
| 5,508,840 A | 4/1996 | Vogel et al. | 5,815,126 A | 9/1998 | Fan et al. |
| 5,508,841 A | 4/1996 | Lin et al. | 5,825,443 A | 10/1998 | Kawasaki et al. |
| 5,510,758 A | 4/1996 | Fujita et al. | 5,835,255 A | 11/1998 | Miles |
| 5,510,824 A | 4/1996 | Nelson | 5,835,256 A | 11/1998 | Huibers |
| 5,512,374 A | 4/1996 | Wallace et al. | 5,837,562 A | 11/1998 | Cho |
| 5,512,748 A | 4/1996 | Hanson | 5,841,579 A | 11/1998 | Bloom et al. |
| 5,515,076 A | 5/1996 | Thompson et al. | 5,844,711 A | 12/1998 | Long, Jr. |
| 5,516,125 A | 5/1996 | McKenna | 5,847,859 A | 12/1998 | Murata |
| 5,517,340 A | 5/1996 | Doany et al. | 5,862,164 A | 1/1999 | Hill |

| | | |
|---|---|---|
| 5,868,854 A | 2/1999 | Kojima et al. |
| 5,886,675 A | 3/1999 | Aye et al. |
| 5,892,505 A | 4/1999 | Tropper |
| 5,895,233 A | 4/1999 | Higashi et al. |
| 5,898,515 A | 4/1999 | Furlani et al. |
| 5,903,243 A | 5/1999 | Jones |
| 5,903,395 A | 5/1999 | Rallison et al. |
| 5,904,737 A | 5/1999 | Preston et al. |
| 5,910,856 A | 6/1999 | Ghosh et al. |
| 5,912,094 A | 6/1999 | Aksyuk et al. |
| 5,912,608 A | 6/1999 | Asada |
| 5,914,801 A | 6/1999 | Dhuler et al. |
| 5,915,168 A | 6/1999 | Salatino et al. |
| 5,919,548 A | 7/1999 | Barron et al. |
| 5,920,411 A | 7/1999 | Duck et al. |
| 5,920,418 A | 7/1999 | Shiono et al. |
| 5,923,475 A | 7/1999 | Kurtz et al. |
| 5,926,309 A | 7/1999 | Little |
| 5,926,318 A | 7/1999 | Hebert |
| 5,942,791 A | 8/1999 | Shorrocks et al. |
| 5,949,390 A | 9/1999 | Nomura et al. |
| 5,949,570 A | 9/1999 | Shiono et al. |
| 5,953,161 A | 9/1999 | Troxell et al. |
| 5,955,771 A | 9/1999 | Kurtz et al. |
| 5,963,788 A | 10/1999 | Barron et al. |
| 5,978,127 A | 11/1999 | Berg |
| 5,982,553 A | 11/1999 | Bloom et al. |
| 5,986,634 A | 11/1999 | Alioshin |
| 5,986,796 A | 11/1999 | Miles |
| 5,995,303 A | 11/1999 | Honguh et al. |
| 5,999,319 A | 12/1999 | Castracane |
| 6,004,912 A | 12/1999 | Gudeman |
| 6,016,222 A | 1/2000 | Setani et al. |
| 6,025,859 A | 2/2000 | Ide et al. |
| 6,038,057 A | 3/2000 | Brazas, Jr. et al. |
| 6,040,748 A | 3/2000 | Gueissaz |
| 6,046,840 A | 4/2000 | Huibers |
| 6,055,090 A | 4/2000 | Miles |
| 6,057,520 A | 5/2000 | Goodwin-Johansson |
| 6,061,166 A | 5/2000 | Furlani et al. |
| 6,061,489 A | 5/2000 | Ezra et al. |
| 6,062,461 A | 5/2000 | Sparks et al. |
| 6,064,404 A | 5/2000 | Aras et al. |
| 6,069,392 A | 5/2000 | Tai et al. |
| 6,071,652 A | 6/2000 | Feldman et al. |
| 6,075,632 A | 6/2000 | Braun |
| 6,084,626 A | 7/2000 | Ramanujan et al. |
| 6,088,102 A | 7/2000 | Manhart |
| 6,090,717 A | 7/2000 | Powell et al. |
| 6,091,521 A | 7/2000 | Popovich |
| 6,096,576 A | 8/2000 | Corbin et al. |
| 6,097,352 A | 8/2000 | Zavracky et al. |
| 6,101,036 A | 8/2000 | Bloom |
| 6,115,168 A | 9/2000 | Zhao et al. |
| 6,122,299 A | 9/2000 | DeMars et al. |
| 6,123,985 A | 9/2000 | Robinson et al. |
| 6,124,145 A | 9/2000 | Stemme et al. |
| 6,130,770 A | 10/2000 | Bloom |
| 6,144,481 A | 11/2000 | Kowarz et al. |
| 6,147,789 A | 11/2000 | Gelbart |
| 6,154,259 A | 11/2000 | Hargis et al. |
| 6,154,305 A | 11/2000 | Dickensheets et al. |
| 6,163,026 A | 12/2000 | Bawolek et al. |
| 6,163,402 A | 12/2000 | Chou et al. |
| 6,169,624 B1 | 1/2001 | Godil et al. |
| 6,172,796 B1 | 1/2001 | Kowarz et al. |
| 6,172,797 B1 | 1/2001 | Huibers |
| 6,177,980 B1 | 1/2001 | Johnson |
| 6,181,458 B1 | 1/2001 | Brazas, Jr. et al. |
| 6,188,519 B1 | 2/2001 | Johnson |
| 6,195,196 B1 | 2/2001 | Kimura et al. |
| 6,197,610 B1 | 3/2001 | Toda |
| 6,210,988 B1 | 4/2001 | Howe et al. |
| 6,215,579 B1 | 4/2001 | Bloom et al. |
| 6,219,015 B1 | 4/2001 | Bloom et al. |
| 6,222,954 B1 | 4/2001 | Riza |
| 6,229,650 B1 | 5/2001 | Reznichenko et al. |
| 6,229,683 B1 | 5/2001 | Goodwin-Johansson |
| 6,241,143 B1 | 6/2001 | Kuroda |
| 6,249,381 B1 | 6/2001 | Suganuma |
| 6,251,842 B1 | 6/2001 | Gudeman |
| 6,252,697 B1 | 6/2001 | Hawkins et al. |
| 6,254,792 B1 | 7/2001 | Van Buskirk et al. |
| 6,261,494 B1 | 7/2001 | Zavracky et al. |
| 6,268,952 B1 | 7/2001 | Godil et al. |
| 6,271,145 B1 | 8/2001 | Toda |
| 6,271,808 B1 | 8/2001 | Corbin |
| 6,274,469 B1 | 8/2001 | Yu |
| 6,282,213 B1 | 8/2001 | Gutin et al. |
| 6,286,231 B1 | 9/2001 | Bergman et al. |
| 6,290,859 B1 | 9/2001 | Fleming et al. |
| 6,290,864 B1 | 9/2001 | Patel et al. |
| 6,300,148 B1 | 10/2001 | Birdsley et al. |
| 6,303,986 B1 | 10/2001 | Shook |
| 6,310,018 B1 | 10/2001 | Behr et al. |
| 6,313,901 B1 | 11/2001 | Cacharelis |
| 6,323,984 B1 | 11/2001 | Trisnadi |
| 6,327,071 B1 | 12/2001 | Kimura |
| 6,342,960 B1 | 1/2002 | McCullough |
| 6,346,430 B1 | 2/2002 | Raj et al. |
| 6,356,577 B1 | 3/2002 | Miller |
| 6,356,689 B1 | 3/2002 | Greywall |
| 6,359,333 B1 | 3/2002 | Wood et al. |
| 6,384,959 B1 | 5/2002 | Furlani et al. |
| 6,387,723 B1 | 5/2002 | Payne et al. |
| 6,392,309 B1 | 5/2002 | Wataya et al. |
| 6,396,789 B1 | 5/2002 | Guerra et al. |
| 6,418,152 B1 | 7/2002 | Davis |
| 6,421,179 B1 | 7/2002 | Gutin et al. |
| 6,438,954 B1 | 8/2002 | Goetz et al. |
| 6,445,502 B1 | 9/2002 | Islam et al. |
| 6,452,260 B1 | 9/2002 | Corbin et al. |
| 6,466,354 B1 | 10/2002 | Gudeman |
| 6,479,811 B1 | 11/2002 | Kruschwitz et al. |
| 6,480,634 B1 | 11/2002 | Corrigan |
| 6,497,490 B1 | 12/2002 | Miller |
| 6,525,863 B1 | 2/2003 | Riza |
| 6,563,974 B2 | 5/2003 | Riza |
| 6,565,222 B1 | 5/2003 | Ishii et al. |
| 6,569,717 B1 | 5/2003 | Murade |
| 2001/0019454 A1 | 9/2001 | Tadic-Galeb et al. |
| 2002/0015230 A1 | 2/2002 | Pilossof et al. |
| 2002/0021485 A1 | 2/2002 | Pilossof |
| 2002/0079432 A1 | 6/2002 | Lee et al. |
| 2002/0105725 A1 | 8/2002 | Sweatt et al. |
| 2002/0112746 A1 | 8/2002 | DeYoung et al. |
| 2002/0131230 A1 | 9/2002 | Potter |
| 2002/0135708 A1 | 9/2002 | Murden et al. |
| 2002/0176151 A1 | 11/2002 | Moon et al. |
| 2003/0056078 A1 | 3/2003 | Johansson et al. |

FOREIGN PATENT DOCUMENTS

| | | | | |
|---|---|---|---|---|
| DE | 197 51 716 A1 | 5/1998 | ........... | G02B/27/14 |
| DE | 198 46 532 C1 | 10/1998 | ........... | G02B/27/09 |
| EP | 0 089 044 A2 | 9/1983 | ........... | H01L/23/10 |
| EP | 0 261 901 A2 | 3/1988 | ........... | G09G/3/36 |
| EP | 0 314 437 A1 | 10/1988 | ........... | H01L/25/08 |
| EP | 0 304 263 A2 | 2/1989 | ......... | H01L/25/065 |
| EP | 0 306 308 A2 | 3/1989 | ........... | H04N/3/14 |
| EP | 0 322 714 A2 | 7/1989 | ........... | G02B/5/30 |
| EP | 0 627 644 A3 | 9/1990 | ........... | G02B/27/00 |
| EP | 0 417 039 A1 | 3/1991 | ........... | G03B/21/20 |

| | | | | |
|---|---|---|---|---|
| EP | 0 423 513 A2 | 4/1991 | ........... | H01S/3/085 |
| EP | 0 436 738 A1 | 7/1991 | ........... | H04N/5/74 |
| EP | 0 458 316 A2 | 11/1991 | ........... | G06K/11/06 |
| EP | 0 477 566 A2 | 4/1992 | ........... | G02B/26/08 |
| EP | 0 455 326 A3 | 6/1992 | ............ | G09G/3/28 |
| EP | 0 499 566 A2 | 8/1992 | ........... | G06F/3/033 |
| EP | 0528 646 A1 | 2/1993 | ............ | G09G/3/02 |
| EP | 0 530 760 A2 | 3/1993 | ............ | G09G/3/34 |
| EP | 0 550 189 A1 | 7/1993 | ........... | G02F/1/315 |
| EP | 0 610 665 A1 | 8/1994 | ............ | G09G/3/34 |
| EP | 0 617 644 A2 | 12/1994 | ........... | G02B/27/00 |
| EP | 0 627 850 A1 | 12/1994 | ............ | H04N/5/64 |
| EP | 0 643 314 A2 | 3/1995 | ........... | G02B/27/00 |
| EP | 0 654 777 A1 | 5/1995 | ............ | G09G/3/34 |
| EP | 0 658 868 A1 | 6/1995 | ............ | G09G/3/34 |
| EP | 0 658 830 A1 | 12/1995 | ............ | G09G/3/34 |
| EP | 0 689 078 A1 | 12/1995 | ........... | G02B/26/08 |
| EP | 0 801 319 A1 | 10/1997 | ........... | G02B/26/00 |
| EP | 0 851 492 A2 | 7/1998 | ......... | H01L/23/538 |
| EP | 1 003 071 A2 | 5/2000 | ........... | G03B/27/72 |
| EP | 1 014 143 A1 | 6/2000 | ........... | G02B/26/08 |
| EP | 1 040 927 A2 | 10/2000 | ............ | B41J/2/455 |
| GB | 2 117 564 A | 10/1983 | ........... | H01L/25/08 |
| GB | 2 118 365 A | 10/1983 | ........... | H01L/27/13 |
| GB | 2 266 385 A | 10/1993 | ........... | G02B/23/10 |
| GB | 2 296 152 A | 6/1996 | .......... | H04N/13/04 |
| GB | 2 319 424 A | 5/1998 | .......... | H04N/13/04 |
| JP | 53-39068 | 4/1978 | ........... | H01L/23/12 |
| JP | 55-111151 | 8/1980 | ........... | H01L/27/00 |
| JP | 57-31166 | 2/1982 | ........... | H01L/23/48 |
| JP | 57-210638 | 12/1982 | ........... | H01L/21/60 |
| JP | 60-49638 | 3/1985 | ........... | H01L/21/60 |
| JP | 60-94756 | 5/1985 | ........... | H01L/25/04 |
| JP | 60-250639 | 12/1985 | ........... | H01L/21/58 |
| JP | 61-142750 | 6/1986 | ........... | H01L/21/60 |
| JP | 61-145838 | 7/1986 | ........... | H01L/21/60 |
| JP | 63-234767 | 9/1988 | ........... | H04N/1/04 |
| JP | 63-305323 | 12/1988 | ............ | G02F/1/13 |
| JP | 1-155637 | 6/1989 | ........... | H01L/21/66 |
| JP | 40-1155637 | 6/1989 | ........... | H01L/21/92 |
| JP | 2219092 | 8/1990 | ............ | G09G/3/28 |
| JP | 4-333015 | 11/1992 | ........... | G02B/27/18 |
| JP | 7-281161 | 10/1995 | ......... | G02F/1/1333 |
| JP | 3288369 | 3/2002 | ........... | G02B/26/06 |
| WO | WO 90/13913 | 11/1990 | ........... | H01L/23/10 |
| WO | WO 92/12506 | 7/1992 | .............. | G09F/9/37 |
| WO | WO 93/02269 | 2/1993 | ............. | E06B/5/10 |
| WO | WO 93/09472 | 5/1993 | ............. | G03F/7/20 |
| WO | WO 93/18428 | 9/1993 | ........... | G02B/27/00 |
| WO | WO 93/22694 | 11/1993 | ............ | G02B/5/18 |
| WO | WO 94/09473 | 4/1994 | ........... | G09G/3/34 |
| WO | WO 94/29761 | 12/1994 | ........... | G02B/27/24 |
| WO | WO 95/11473 | 4/1995 | ........... | G02B/27/00 |
| WO | WO 96/02941 | 2/1996 | ........... | H01L/23/02 |
| WO | WO 96/08031 | 3/1996 | ............ | H01J/29/12 |
| WO | WO 96/41217 | 12/1996 | ............ | G02B/5/18 |
| WO | WO 96/41224 | 12/1996 | ........... | G02B/19/00 |
| WO | WO 97/22033 | 6/1997 | ........... | G02B/27/22 |
| WO | WO 97/26569 | 7/1997 | ............ | G02B/5/18 |
| WO | WO 98/05935 | 2/1998 | ............. | G01L/9/06 |
| WO | WO 98/24240 | 6/1998 | ............ | H04N/9/31 |
| WO | WO 98/41893 | 9/1998 | ........... | G02B/26/08 |
| WO | WO 99/07146 | 2/1999 | ............ | H04N/7/16 |
| WO | WO 99/12208 | 3/1999 | ......... | H01L/25/065 |
| WO | WO 99/23520 | 5/1999 | ........... | G02B/26/08 |
| WO | WO 99/34484 | 7/1999 | | |
| WO | WO 99/59335 | 11/1999 | ...... | H04N/5/765 |
| WO | WO 99/63388 | 12/1999 | ........... | G02B/27/22 |
| WO | WO 99/67671 | 12/1999 | ........... | G02B/26/08 |
| WO | WO 00/04718 | 1/2000 | ........... | H04N/7/167 |
| WO | WO 00/07225 | 2/2000 | ........... | H01L/21/00 |
| WO | WO 01/04674 A1 | 1/2001 | ............ | G02B/6/12 |
| WO | WO 01/006297 A3 | 1/2001 | ........... | G02B/27/10 |
| WO | WO 01/57581 A3 | 8/2001 | ........... | G02B/27/48 |
| WO | WO 02/025348 A3 | 3/2002 | ........... | G02B/26/02 |
| WO | WO 02/31575 A2 | 4/2002 | ........... | G02B/27/00 |
| WO | WO 02/058111 A2 | 7/2002 | | |
| WO | WO 02/065184 A3 | 8/2002 | ........... | G02B/27/12 |
| WO | WO 02/073286 A2 | 9/2002 | ........... | G02B/26/08 |
| WO | WO 02/084375 A1 | 10/2002 | ........... | G02B/26/08 |
| WO | WO 02/084397 A3 | 10/2002 | ........... | G02B/27/18 |
| WO | WO 03/001281 A1 | 1/2003 | ............. | G02F/1/01 |
| WO | WO 03/001716 A1 | 1/2003 | ............ | H04J/14/02 |
| WO | WO 03/012523 A1 | 2/2003 | ........... | G02B/26/00 |
| WO | WO 03/016965 A1 | 2/2003 | ............ | G02B/5/18 |
| WO | WO 03/023849 A1 | 3/2003 | ........... | H01L/23/02 |
| WO | WO 03/025628 A2 | 3/2003 | | |

OTHER PUBLICATIONS

O. Solgaard, "Integrated Semiconductor Light Modulators for Fiber–Optic and Display Applications", PH.D. Dissertation, Stanford University Feb., 1992.

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7$^{th}$ International Conference on Solid–State Sensors and Actuators. No Date Available.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

D. Rowe, "Laser Beam Scanning,"SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp 255–269, 1997.

Buhler et al., "Linear Array of Complementary Metal Oxide Semiconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings*, Sensors and Actuators A, pp. 7–15, 1998.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997.pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, February 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promises Improved Resolution, Contrast, and Speed, XP–000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", p. 103–115.

Olga B. Spahn, et al., "High Optical Power Handling of Pop–Up Microelectromechanical Mirrors", IEEE 2000, pg. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminum Mirror," Physical Electronics Laboratory, 1991 IEEE, pp. 547–550.

M. Parameswaran et al., "Commerical CMOS Fabricated Integrated Dynamic Thermal Scene Simulator," 1991 IEEE, pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M. Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21—A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modelling of CMOS Compatible High Voltage Device Structures," pp. 41–50. No Date Available.

Jon Gildemeister, "Xenon Difluoride Etching System," 1997, UC Berkeley MicroTabrication Manual Chapter 7.15, p. 2–5.

W. Riethmuller et al., "A smart accelerometer with on–chip electronics fabricated by a commercial CMOS process," Sensors and Actuators A. 31, (1992), 121–124.

W. Gopel et al., "Sensors—A Comprehensive Survey," vol. 7, Weinheim New York, 44 pgs. No Date Available.

D. E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the Al/SiO2 interfaces," 1985 American Institute of Physics, pp. 5256–52616.

Daniel L. Flamm et al., "XeF2 and F–Atom Reactions with Si: Their Significance for Plasma Etching,," Solid State Technology, v. 26, #4, 4/83, pp. 117–121. Apr. 1983.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 94, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169, 358–360.

T. Glaser et al., "Beam switching with binary single-order diffractive grating", XP-000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP-002183475, Dept. of Applied Physics, Calcutta University, 1975, pp. 63–67.

J. W. Goodman, "Some Fundamental Properties of Speckle", XP-002181682, Dept. of Electrical Engineering, Stanford University, 1976, pp. 1146–1150.

Lingli Wang et al., "Speckle Reduction in Laser Projection Systems by Diffractive Optical Elements", XP-000754330, Applied Optics, Apr. 1, 1998, vol. 37, No. 10, pp. 1770–1775.

R.W. Corrigan et al., "Calibration of a Scanned Linear Grating Light–Valve, Projection System for E–Cinema Applications", Silicon Light Machines, SID'99, San Jose, CA, 27 pgs. 1999.

R.W. Corrigan et al., "Calibration of a Scanned Linear Grating Light–Valve, Projection System for E–Cinema Applications", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Micromirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Applications", IEEE Protonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14. No Date Available.

A. P. Payne et al., "Resonance Measurements of Stresses in Al/$Si_3N_4$ Micro–Ribbons", Silicon Light Machines, Sep. 22, 1999, 11 pgs.

M. W. Miles, "A New Reflective FPD Technology Using Interferometric Modulation", 4 pgs. No Date Available.

N. A. Riza et al., "Digitally Controlled Fault–Tolerant Multiwavelength Programmable Fiber–Optic Attenuator Using a Two–Dimensional Digital Mucromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

DIFFRACTIVE LIGHT MODULATOR WITH DYNAMICALLY ROTATABLE DIFFRACTION PLANE

FIELD OF THE INVENTION

The present invention relates to diffractive light modulators. More particularly, this invention relates to diffractive light modulators with dynamically rotatable diffraction planes.

BACKGROUND OF THE INVENTION

Bloom et al. in U.S. Pat. No. 5,311,360, entitled "Method and Apparatus for Modulating a Light Bean," teach a grating light valve which operates in a reflection mode and a diffraction mode. The grating light valve includes elongated elements suspended above a substrate. In the reflective mode, reflective surfaces of the grating light valve cause incident light to constructively combine to form reflected light. In the diffractive mode, the reflective surfaces of the grating light valve are separated by about a quarter wavelength of the incident light to produce diffracted light. When the grating light valve is in the diffractive mode, the grating light valve predominantly diffracts light into a plus one diffraction order and a minus one diffraction order but also diffracts a small amount of light into higher diffraction orders. The incident light diffracts according to the direction of periodicity. In the case of the grating light valve, the direction of the periodicity is perpendicular to the elongated elements. Therefore, in the diffraction mode, the light is diffracted in a diffraction plane perpendicular to the elongated elements.

In WDM (wavelength division multiplex) optical communication, multiple component wavelengths of light each carry a communication signal. Each of the multiple component wavelengths of light form a WDM channel. Many applications require switching of a signal from one channel to another. Other applications require the equalization of the output signals as well as excellent extinction in the non-switched fibers. For example, switching an input light signal from one channel to another can be achieved by using a diffractive light modulator, such as a grating light valve, to diffract the input light into a first order of light, while reflecting very little light, ideally no light, as specularly reflected zero order light. The diffracted light is diffracted along a known diffraction plane and the first order light is collected as output for an output port of a switch. The diffracted first order light can also be attenuated by controlled means, thereby equalizing the light that has been "switched" into the first order. It is common practice to perform the switching and equalizing functions at the same physical location for convenience, maintenance, and economic advantages.

Although light can be diffracted into higher orders than the first order for switching and attenuation applications, it is easier and more efficient to diffract and collect light into and out of the first order. However, not much flexibility is provided with only one first order per diffraction plane.

What is needed is a diffractive light modulator that produces multiple diffraction planes. What is further needed is a diffractive light modulator that produces multiple diffraction planes and dynamically utilizes the multiple diffraction planes.

SUMMARY OF THE INVENTION

An embodiment of the present invention includes a light modulator. The light modulator includes elongated elements and a support structure. The elongated elements are arranged in parallel. Each element includes a light reflective planar surface with the light reflective planar surfaces lying in one or more parallel planes. The support structure is coupled to the elongated elements to maintain a position of the elongated elements relative to each other and to enable movement of each elongated element between a first modulator configuration and a second modulator configuration. In the first modulator configuration, the elongated elements act to reflect incident light as a plane mirror. In the second modulator configuration, selected groups of elements are deflected and act to diffract the incident light along one or more of a plurality of diffraction planes. The groups of elements are configured according to one of a plurality of selectable group configurations. Each group configuration corresponds to one of the plurality of diffraction planes.

Each element includes a first edge and a second edge. In an active optical area, the first edge is preferably linear and is formed at a first edge angle relative to a lengthwise axis of the elongated element. The second edge is also preferably linear within the active optical area and is formed at a second edge angle relative to the lengthwise axis of the elongated element. The first edge angle is preferably zero and the second edge angle is preferably non-zero. Each group configuration includes at least two adjacent elements such that one of the first edge and the second edge of a first end element of the group configuration forms a first outer group edge, and one of the first edge and the second edge of a second end element of the group configuration forms a second outer group edge. The edge angles of the first and second outer group edges are the same. Alternating groups of elements can be deflected a distance of about one-quarter the wavelength of the incident light thereby diffracting the incident light along a first diffraction plane perpendicular to the outer group edge. One or more elements of each group of a remaining groups of elements can be deflected a distance within a range of zero to about one-quarter the wavelength of the incident light, thereby diffracting a portion of the incident light along a second diffraction plane perpendicular to a non-deflected element edge nearest the one or more elements. A selectable diffraction plane is formed perpendicular to the outer group edge of each group configuration.

DETAILED DESCRIPTION OF THE EMBODIMENTS

Embodiments of a light modulator of the present invention create controllable structures that, depending on the configuration, rotate a diffraction plane such that diffracted light is similarly rotated. By selectively configuring the light modulator to diffract light along one of a plurality of selectable diffraction planes, a first order of diffracted light is essentially directed to one of a plurality of different locations. Each location corresponds to one of the plurality of diffraction planes. One advantage of directing light into selective diffraction planes is in switching applications. First order diffracted light can be collected at the different locations, each different location corresponding to an output port of a switch.

Figure 1:
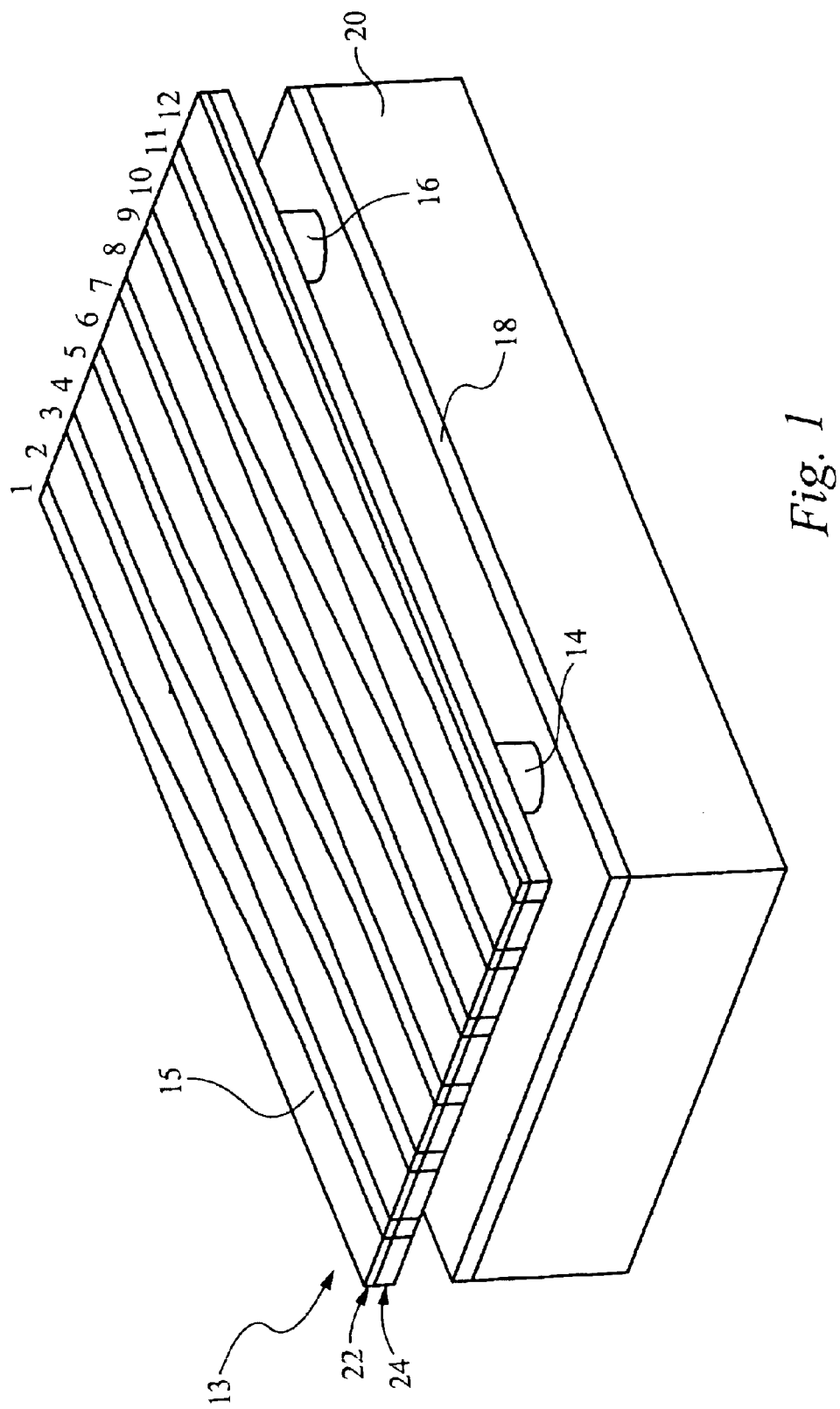
FIG. 1 illustrates a first and preferred embodiment of the diffractive light modulator according to the present invention.

A diffractive light modulator 13 according to a first and preferred embodiment of the present invention is shown in FIG. 1. Preferably, the diffractive light modulator is a grating light valve. The diffractive light modulator 13 comprises elongated elements 15 suspended by first and second posts, 14 and 16, above a substrate 20. Preferably, the elongated elements 15 are ribbons of the grating light valve, and each ribbon is separated by a constant gap width. The substrate 20 comprises a conductor 18. In operation, the diffractive light modulator 13 operates to produce modulated light selected from a reflection mode and one of two diffraction modes. Preferably, the incident light comprises wavelength division multiplexed (WDM) signals where each wavelength comprises an optical channel, as is well known in the art. Each channel impinges appropriate ones of the elongated elements 15 on the diffractive light modulator 13. Preferably, each channel impinges 12 elongated elements 15. FIG. 1 illustrates the elongated elements 15 corresponding to a single optical channel. It is understood that the diffractive light modulator 13 can include more, or less, elongated elements 15 than that shown in FIG. 1. It is also understood that each optical channel can impinge more, or less, than 12 elongated elements 15, as appropriate.

Figure 2A:
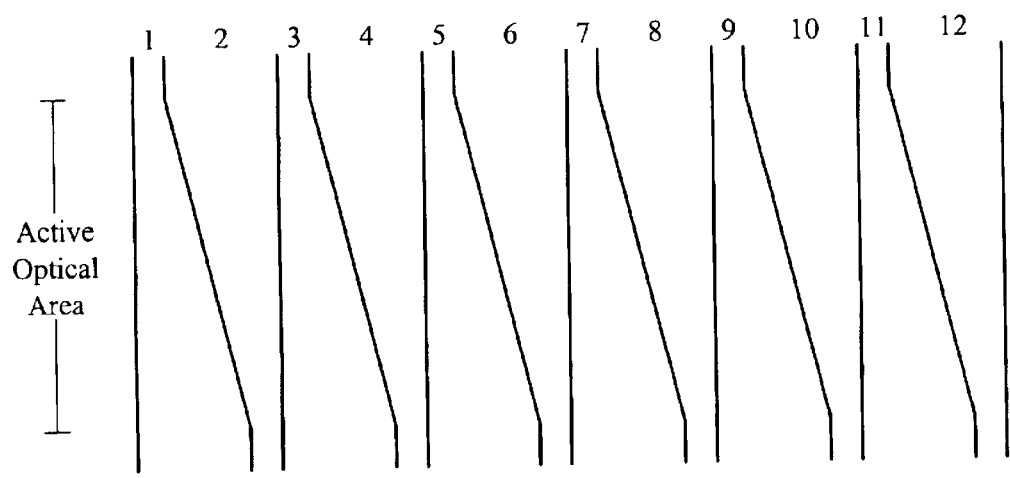
FIG. 2A illustrates a top-down view of the diffractive light modulator according to the first embodiment.

The elongated elements 15 comprise a conducting and reflecting surface 22 and a resilient material 24. Preferably, the resilient material 24 comprises silicon nitride. Preferably, the conductive and reflective surface 22 comprises aluminum. Alternatively, the conductive and reflective surface 22 comprises a different metal, and the resilient material comprises a different resilient material. Each elongated element 15 includes a first edge and a second edge. In the preferred embodiment, the first edge is linear and parallel to a lengthwise axis of the elongated element 15, and the second edge is linear and is formed at an angle to the lengthwise axis of the elongated element 15 within an active optical area (FIG. 2A). Within the preferred embodiment, the first edge is referred to as a straight edge and the second edge is referred to as a diagonal edge. The active optical area is an area of the diffractive light modulator 13 on which the incident light impinges the elongated elements 15. The portion of the second edge that is at an angle to the lengthwise axis includes the active optical area. Preferably, a remaining portion of the second edge, which is outside the active optical area, is parallel to the lengthwise axis of the elongated elements 15.

Figure 2B:
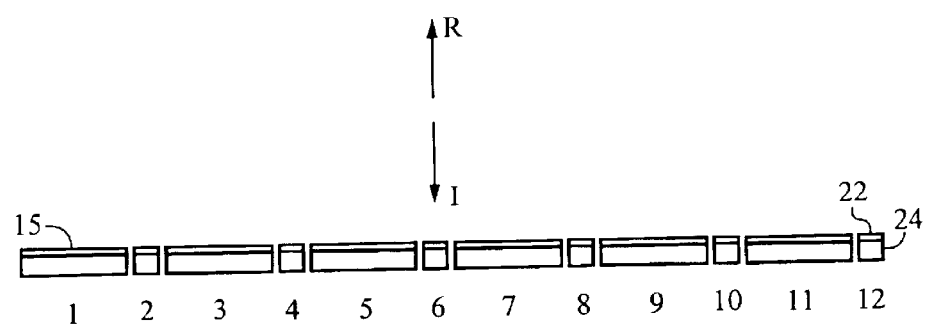
FIG. 2B illustrates a cross-section of the elongated elements of the diffractive light modulator a reflection mode according to the first embodiment.

FIG. 2A illustrates a top-down view of the diffractive light modulator 13 according to the preferred embodiment. FIG. 2B illustrates a cross-section of the elongated elements 15 of the diffractive light modulator 13 according to the preferred embodiment. Both FIGS. 2A and 2B illustrate the diffractive light modulator 13 in a reflection mode. In the reflection mode, the conducting and reflecting surfaces 22 of the elongated elements 15 form a plane so that incident light I (FIG. 2B) reflects from the elongated elements 15 to produce reflected light R (FIG. 2B).

Figure 3A:
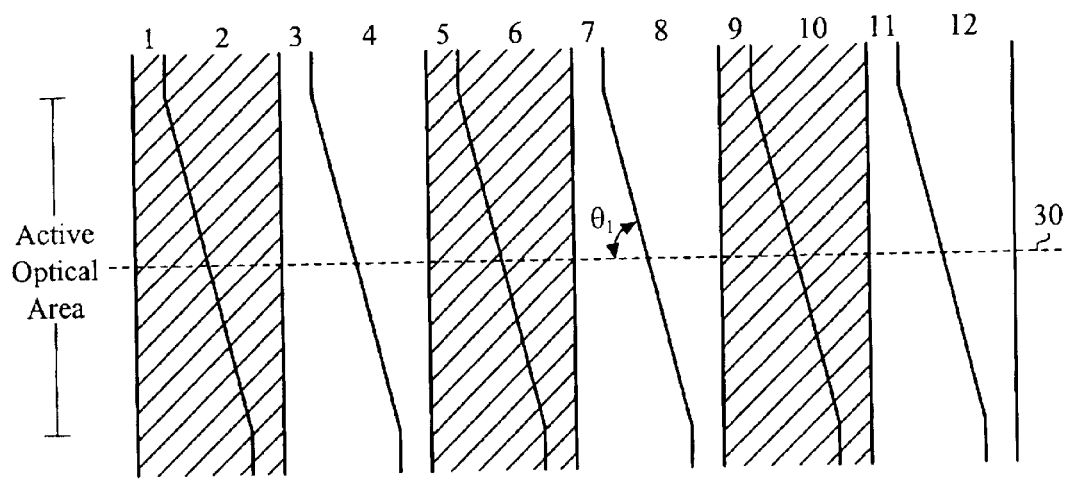
FIG. 3A illustrates a top-down view of the first embodiment of the diffractive light modulator in a first diffraction mode.
Figure 3B:
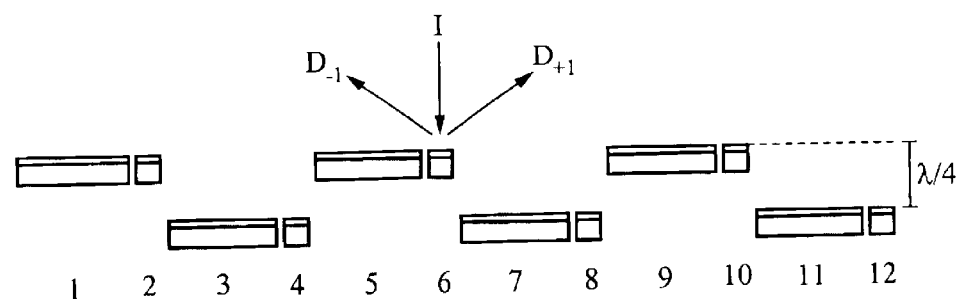
FIG. 3B illustrates a cross-section of the elongated elements of the first embodiment of the diffractive light modulator in the first diffractive mode.

FIG. 3A illustrates a top-down view of the first embodiment of the diffractive light modulator 13 in a first diffraction mode. FIG. 3B illustrates a cross-section of the elongated elements 15 of the diffractive light modulator 13 in the first diffractive mode. In the first diffraction mode, adjacent pairs of elongated elements 15 are configured as groups. Each group includes a first group edge and a second group edge. While in the first diffraction mode, the first group edge and the second group edge are the straight edges of the two elongated elements 15 comprising the group, where the straight edges are the linear edges parallel to the lengthwise axis of the elongated elements 15.

In the first diffraction mode, an electrical bias causes alternate groups of the elongated elements 15 to move toward the substrate 20. As shown in FIGS. 3A and 3B, ribbons 3, 4, 7, 8, 11 and 12 are the elongated elements 15 that are moved according to the first diffraction mode. The electrical bias is applied between the reflecting and conducting surfaces 22 of the alternate groups of the elongated elements 15 and the conductor 18. The electrical bias results in a height difference between the alternate groups of the elongated elements 15 and non-biased ones of the elongated elements 15. A height difference of a quarter wavelength λ/4 of the incident light I produces maximum diffracted light including plus one and minus one diffraction orders, D+1 and D−1, as shown in FIG. 3B.

It will be readily apparent to one skilled in the art that the conducting and reflecting surface 22 can be replaced by a multilayer dielectric reflector and a conducting element where the conducting element is buried within each of the elongated elements 15. Further, it will be readily apparent to one skilled in the art that the conducting and reflecting surface 22 can be coated with a transparent layer such as an anti-reflective layer.

In the first diffractive mode, the straight edges of each group form "steps." These straight edges are parallel to each other and the steps lie in the same plane, and therefore form a periodicity. Light diffracts in the direction of the periodicity. In general, if there is periodicity in one-dimension, then there is diffraction in one-dimension. If there is periodicity in two-dimensions, then there is diffraction in two-dimensions, and so on. As shown in FIG. 3A, the direction of the periodicity while in the first diffraction mode is perpendicular to the straight edges of the elongated elements 15. Therefore, the diffracted light is directed along a first diffraction plane 30.

Figure 3C:
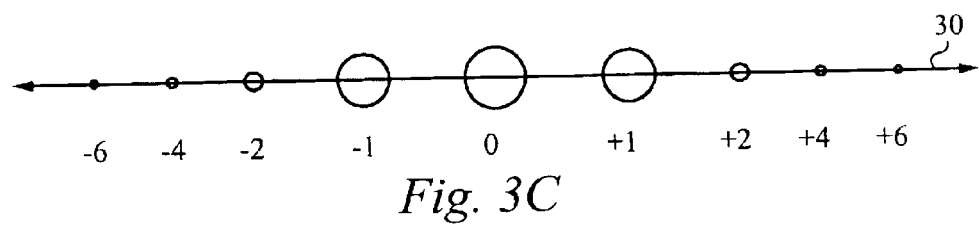
FIG. 3C illustrates an exemplary diffraction pattern along a first diffraction plane while in the first diffraction mode.

FIG. 3C illustrates an exemplary diffraction pattern along the first diffraction plane 30. The diffraction pattern serves only to illustrate the possible locations of the diffracted light while the diffractive light modulator 13 is in the first diffraction mode. While in the first diffraction mode, the incident light I is primarily diffracted into the plus and minus first order along the diffraction plane 30. Trace amounts of the incident light I are diffracted into the higher order lights, for example a plus and minus second order, a plus and minus fourth order and a plus and minus sixth order. The circular shape of the diffraction pattern is for illustrative purposes only and should not serve as a limitation on the actual diffraction pattern. In the reflection mode, the reflected light R is specularly reflected as zero, "0", order light. The diffraction pattern corresponding to the zero order light should approximate the shape of the incident light impinging the diffractive light modulator less attenuation, if any. The diffraction pattern corresponding to the "+1" and "−1" order light are smaller than the "0" order light because when light is diffracted, it is diffracted into the plus and minus first orders as well as the higher orders. Therefore, the diffracted light is distributed over more orders. The size of any one of the diffraction patterns can also vary depending on any attenuation that is performed.

Figure 4A:
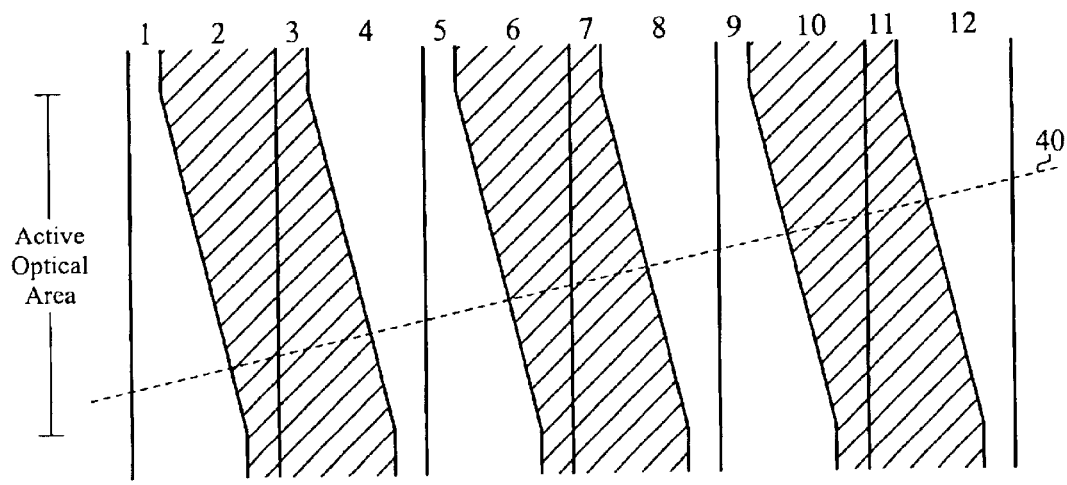
FIG. 4A illustrates a top-down view of the first embodiment of the diffractive light modulator in a second diffraction mode.
Figure 4B:
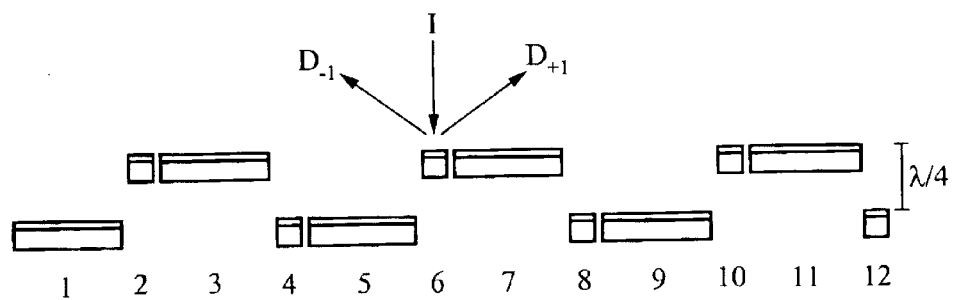
FIG. 4B illustrates a cross-section of the elongated elements of the first embodiment of the diffractive light modulator in the second diffractive mode.

FIG. 4A illustrates a top-down view of the first embodiment of the diffractive light modulator 13 in a second diffraction mode. FIG. 4B illustrates a cross-section of the elongated elements 15 of the diffractive light modulator 13 in the second diffractive mode. In the second diffraction mode, adjacent pairs of elongated elements 15, different from those in the first diffraction mode, are configured as groups. Each group includes a first group edge and a second group edge. In this second diffraction mode, the first group edge and the second group edge are the diagonal edges of the two elongated elements 15 comprising the group, where the diagonal edges are the linear edges formed at an angle to the lengthwise axis of the elongated elements 15. An electrical bias causes alternate groups of the elongated elements 15 to move toward the substrate 20. As shown in FIGS. 4A and 4B, ribbons 1, 4, 5, 8, 9 and 12 are the elongated elements 15 that are moved according to the second diffraction mode. It is understood that although it is preferred that each group comprises a pair of adjacent elongated elements 15, the end ribbons 1 and 12 are not part of a group pair in the second diffraction mode. This is due to the "odd-man-out" nature of reconfiguring the elongated elements 15 into groups, as is expected. The electrical bias results in a height difference between the alternate groups of the elongated elements 15 and non-biased ones of the elongated elements 15. A height difference of a quarter wavelength λ/4 of the incident light I produces maximum diffracted light including plus one and minus one diffraction orders, D+1 and D−1, as shown in FIG. 4B.

In the second diffractive mode, the diagonal edges of each group form steps. Since the diagonal edges are parallel to each other and the steps lie in the same plane, the diagonal edges form a periodicity. As shown in FIG. 4A, the direction of the periodicity, while in the second diffraction mode, is perpendicular to the diagonal edges of the elongated elements 15. While in the second diffraction mode, light is diffracted similarly as in the first diffraction mode, except that the diffracted light is directed along a second diffraction plane 40.

Figure 4C:
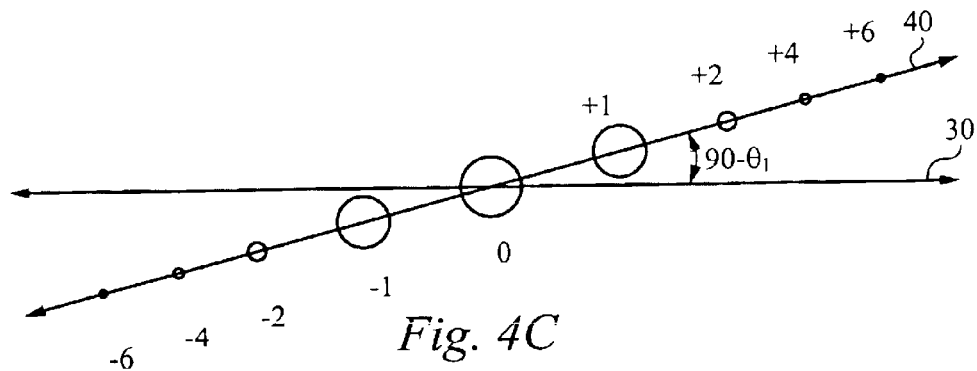
FIG. 4C illustrates an exemplary diffraction pattern along a second diffraction plane while in the second diffraction mode.

FIG. 4C illustrates an exemplary diffraction pattern along the second diffraction plane 30. The diffraction pattern illustrated in FIG. 4C is similar to that illustrated in FIG. 3C related to the first diffraction mode, except that the diffraction pattern of the second diffraction mode is directed along the second diffraction plane 40. If the diagonal edge is formed at an angle θ1 (FIG. 3A) to the diffraction plane 30, then the diffraction plane 40 lies at an angle 90−θ1 (FIG. 4C) to the diffraction plane 30.

The first embodiment of the diffractive light modulator 13 can be used as a 1×3 switch. In this case, the zero order light is collected as the output of a first output port, the first order light in the diffraction plane 30 is collected as the output of a second output port, and the first order light in the diffraction plane 40 is collected as the output of a third output port. Preferably, only the plus first order light or the minus first order light is collected along the diffraction plane 30 for the second output port, and only the plus first order light or the minus first order light is collected along the diffraction plane 40 for the third output port. Alternatively, both the plus and minus first order light is collected along the diffraction plane 30 for the second output port, and both the plus and minus first order light is collected along the diffraction plane 40 for the third output port.

Figure 5A:
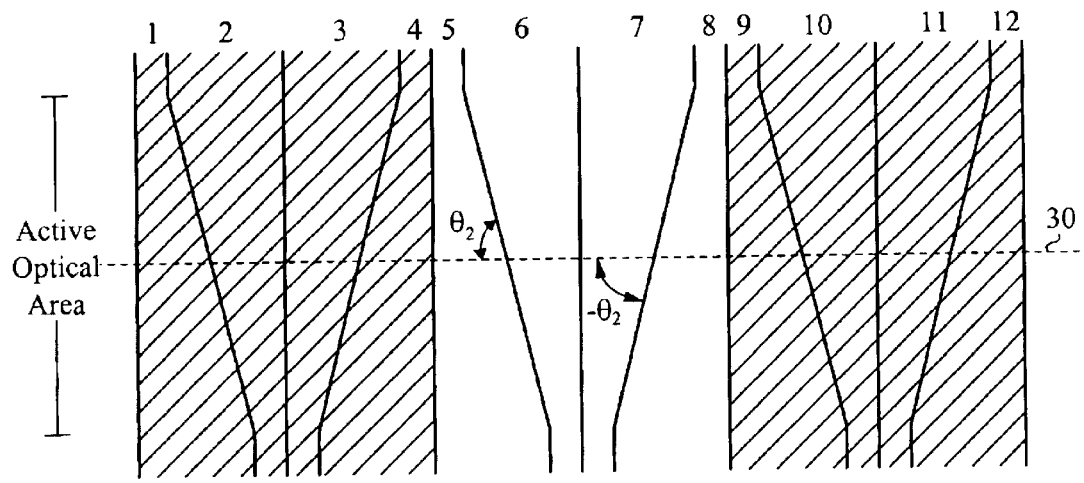
FIG. 5A illustrates a top-down view of a second embodiment of the diffractive light modulator in a third diffraction mode.

It is understood that although the first edge is preferably a straight edge parallel to the lengthwise axis of the elongated elements 15, the first edge can be a linear edge at an angle to the lengthwise axis. The first edge and the second edge are at different angles to the lengthwise axis in order to produce two different diffraction planes when in operation FIG. 5A illustrates a top-down view of a second embodiment of the diffractive light modulator of the present invention. Each elongated element 15 includes a first edge and a second edge. In the second embodiment, the first edge is linear and parallel to a lengthwise axis of the elongated element 15, and the second edge is linear and is formed at a plus or minus angle to the lengthwise axis of the elongated element 15 within an active optical area. Within the second embodiment, the first edge is referred to as a straight edge and the second edge is referred to as a diagonal edge. As illustrated in FIG. 5A, alternating pairs of elongated elements 15 preferably form mirror shapes of each other due to the plus or minus angle of the diagonal edge. Ribbons 1, 2, 5, 6, 9 and 10 include the diagonal edge at the minus angle to the lengthwise axis. Ribbons 3, 4, 7, 8, 11, and 12 include the diagonal edge at the plus angle to the lengthwise axis. In other words, the pattern of the elongated elements 15 repeats every fifth element. The active optical area is an area of the diffractive light modulator 13 on which the incident light impinges the elongated elements 15. The portion of the second edge that is at an angle to the lengthwise axis includes the active optical area. Preferably, a remaining portion of the second edge, which is outside the active optical area, is parallel to the lengthwise axis of the elongated elements 15.

In the second embodiment, the diffractive light modulator 13 operates in a reflection mode and one of a plurality of diffraction modes. In the reflection mode, the conducting and reflecting surfaces 22 of the elongated elements 15 form a plane so that incident light I reflects from the elongated elements 15 to produce reflected light R.

Figure 5B:
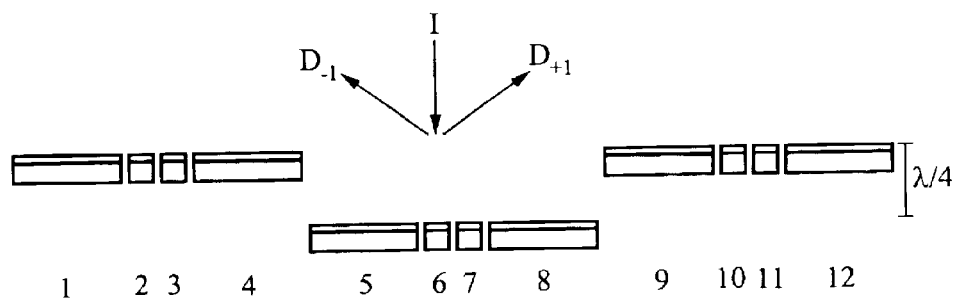
FIG. 5B illustrates a cross-section of the elongated elements of the second embodiment of the diffractive light modulator in the third diffractive mode.

The second embodiment of the diffractive light modulator 13 shown in FIG. 5A is in a third diffraction mode. FIG. 5B illustrates a cross-section of the elongated elements 15 of the diffractive light modulator 13 in the third diffractive mode. In the third diffraction mode, adjacent fours of elongated elements 15 are configured as groups. Each group includes a first group edge and a second group edge. In the third diffraction mode, the first group edge and the second group edge are the straight edges of the first and fourth elongated elements 15 comprising the group, where the straight edges are the linear edges parallel to the lengthwise axis of the elongated elements 15.

In the third diffraction mode, an electrical bias causes alternate groups of the elongated elements 15 to move toward the substrate 20. As shown in FIGS. 5A and 5B, ribbons 5, 6, 7, and 8 are the elongated elements 15 that are moved according to the third diffraction mode. The electrical bias is applied between the reflecting and conducting surfaces 22 of the alternate groups of the elongated elements 15 and the conductor 18. The electrical bias results in a height difference between the alternate groups of the elongated elements 15 and non-biased ones of the elongated elements 15. A height difference of a quarter wavelength $\lambda/4$ of the incident light I produces maximum diffracted light including plus one and minus one diffraction orders, D+1 and D−1, as shown in FIG. 5B.

In the third diffractive mode, the straight edges of each group form steps. Since the straight edges are parallel to each other and the steps lie in the same plane, the straight edges form a periodicity. As shown in FIG. 5A, the direction of the periodicity while in the third diffraction mode is perpendicular to the straight edges of the elongated elements 15. Therefore, the diffracted light is directed along the first diffraction plane 30.

Figure 5C:
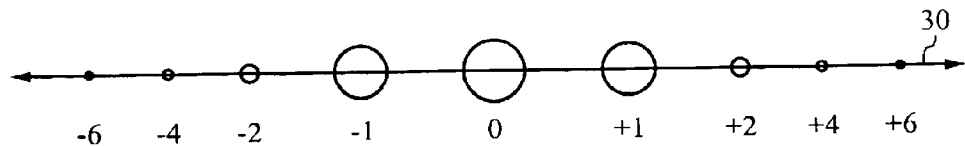
FIG. 5C illustrates an exemplary diffraction pattern along the first diffraction plane while in the third diffraction mode.

FIG. 5C illustrates an exemplary diffraction pattern along the first diffraction plane 30. While in the third diffraction mode, the diffraction pattern serves only to illustrate the possible locations of the diffracted light while the diffractive light modulator 13 is in the third diffraction mode. While in the third diffraction mode, the incident light I is primarily diffracted into the plus and minus first order along the diffraction plane 30. Trace amounts of the incident light I are diffracted into the higher order lights, for example a plus and minus second order, a plus and minus fourth order and a plus and minus sixth order. The circular shape of the diffraction pattern is for illustrative purposes only and should not serve as a limitation on the actual diffraction pattern. In the reflection mode, the reflected light R is specularly reflected zero, "0", order light. The diffraction pattern corresponding to the zero order light should approximate the shape of the incident light impinging the diffractive light modulator less attenuation, if any. The diffraction pattern corresponding to the "+1" and "−1" order light are smaller than the "0" order light because when light is diffracted, it is diffracted into the plus and minus first orders as well as the higher orders. Therefore, the diffracted light is distributed over more orders. The size of any one of the diffraction patterns can also vary depending on any attenuation that is performed.

Figure 6A:
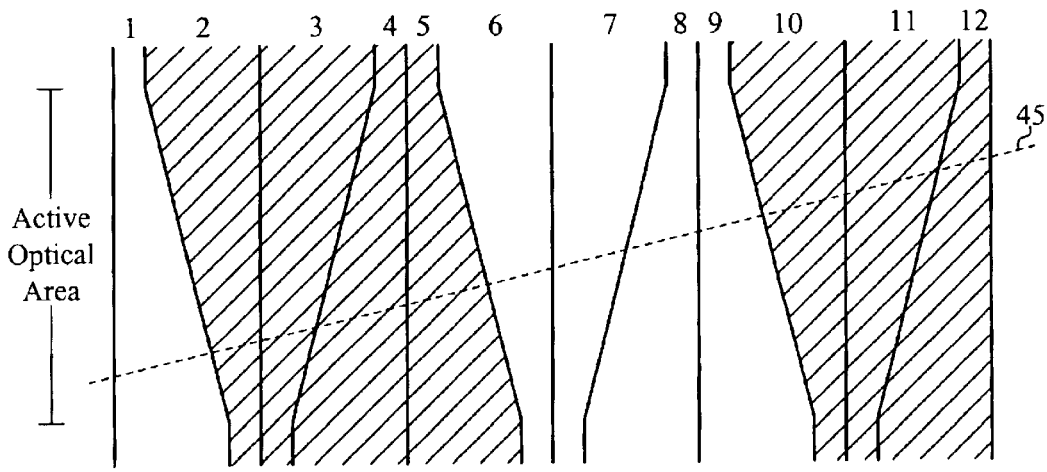
FIG. 6A illustrates a top-down view of the second embodiment of the diffractive light modulator in a fourth diffraction mode.
Figure 6B:
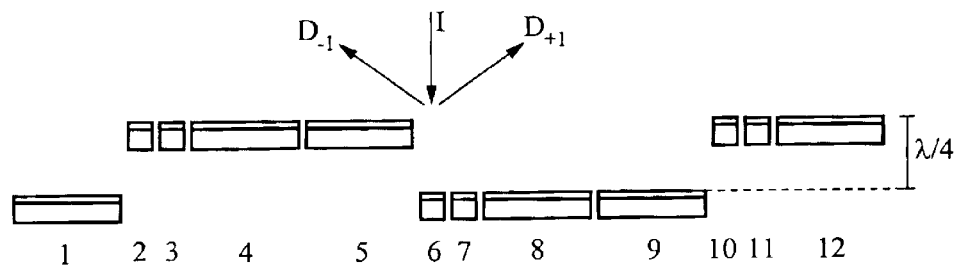
FIG. 6B illustrates a cross-section of the elongated elements of the second embodiment of the diffractive light modulator in the fourth diffractive mode.

FIG. 6A illustrates the second embodiment of the diffractive light modulator 13 in a fourth diffraction mode. FIG. 6B illustrates a cross-section of the elongated elements 15 of the diffractive light modulator 13 in the fourth diffractive mode. In the fourth diffraction mode, adjacent fours of elongated elements 15, different from those in the third diffraction mode, are configured as groups. Each group includes a first group edge and a second group edge. In this fourth diffraction mode, the first group edge and the second group edge are the diagonal edges at the minus angle to the lengthwise axis of the elongated elements 15. An electrical bias causes alternate groups of the elongated elements 15 to move toward the substrate 20. As shown in FIGS. 6A and 6B, ribbons 1, 6, 7, 8, and 9 are the elongated elements 15 that are moved according to the fourth diffraction mode. It is understood that although it is preferred that each group comprises four adjacent elongated elements 15, the end ribbon 1 and the partial group of ribbons 10, 11 and 12 are not part of a complete group of four in the fourth diffraction mode. This is due to the "odd-man-out" nature of reconfiguring the elongated elements 15 into groups, as is expected. The electrical bias results in a height difference between the alternate groups of the elongated elements 15 and non-biased ones of the elongated elements 15. A height difference of a quarter wavelength $\lambda/4$ of the incident light I produces maximum diffracted light including plus one and minus one diffraction orders, D+1 and D−1, as shown in FIG. 6B.

In the fourth diffractive mode, the diagonal edges at the minus angle of each group form steps. Since the diagonal edges at the minus angle are parallel to each other and the steps lie in the same plane, the diagonal edges at the minus angle form a periodicity. As shown in FIG. 6A, the direction of the periodicity, while in the fourth diffraction mode, is perpendicular to the diagonal edges at the minus angle of the elongated elements 15. While in the fourth diffraction mode, light is diffracted similarly as in the third diffraction mode, except that the diffracted light is directed along a third diffraction plane 45.

Figure 6C:
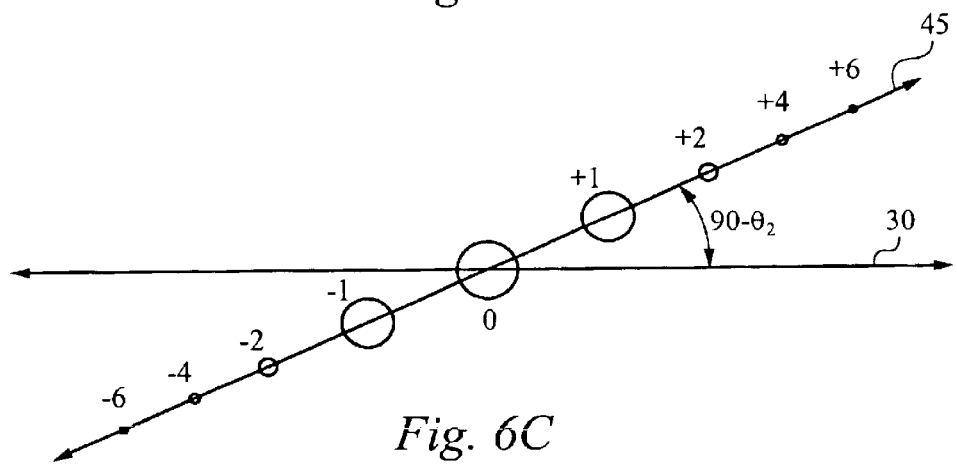
FIG. 6C illustrates an exemplary diffraction pattern along a third diffraction plane while in the fourth diffraction mode.

FIG. 6C illustrates an exemplary diffraction pattern along the third diffraction plane 45 while in the fourth diffraction mode. The diffraction pattern illustrated in FIG. 6C is similar to that illustrated in FIG. 5C related to the third diffraction mode, except that the diffraction pattern of the fourth diffraction mode is directed along the third diffraction plane 45. If the diagonal edge at the minus angle is formed at an angle $\theta 2$ (FIG. 5A) to the diffraction plane 30, then the diffraction plane 45 lies at an angle $90-\theta 2$ (FIG. 6C) to the diffraction plane 30.

Figure 7A:
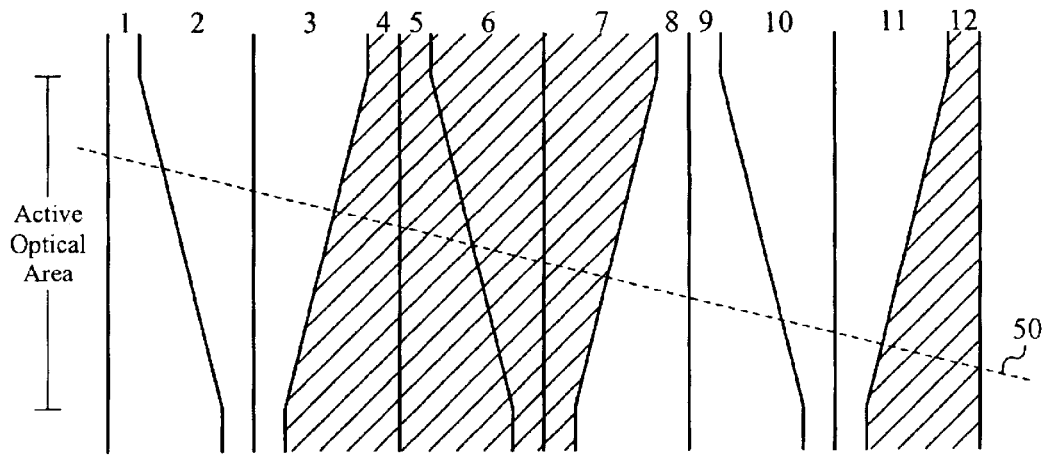
FIG. 7A illustrates a top-down view of the second embodiment of the diffractive light modulator in a fifth diffraction mode.
Figure 7B:
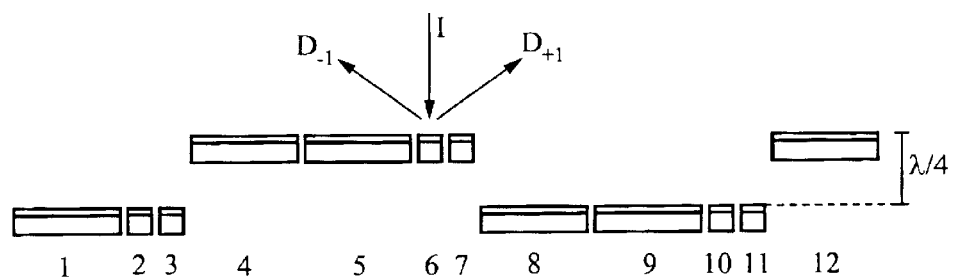
FIG. 7B illustrates a cross-section of the elongated elements of the second embodiment of the diffractive light modulator in the fifth diffractive mode.

FIG. 7A illustrates the second embodiment of the diffractive light modulator 13 in a fifth diffraction mode. FIG. 7B illustrates a cross-section of the elongated elements 15 of the diffractive light modulator 13 in the fifth diffractive mode. In the fifth diffraction mode, adjacent fours of elongated elements 15, different form those in the third and fourth diffraction modes, are configured as groups. Each group includes a first group edge and a second group edge. In this fifth diffraction mode, the first group edge and the second group edge are the diagonal edges at the plus angle to the lengthwise axis of the elongated elements 15. An electrical bias causes alternate groups of the elongated elements 15 to move toward the substrate 20. As shown in FIGS. 7A and 7B, ribbons 1, 2, 3, 8, 9, 10, and 11 are the elongated elements 15 that are moved according to the fifth diffraction mode. It is understood that although it is preferred that each group comprises four adjacent elongated elements 15, the end ribbon 12 and the partial group of ribbons 1, 2 and 3 are not part of a complete group of four in the fifth diffraction mode. This is due to the "odd-man-out" nature of reconfiguring the elongated elements 15 into groups, as is expected. The electrical bias results in a height difference between the alternate groups of the elongated elements 15 and non-biased ones of the elongated elements 15. A height difference of a quarter wavelength $\lambda/4$ of the incident light I produces maximum diffracted light including plus one and minus one diffraction orders, D+1 and D−1, as shown in FIG. 7B.

In the fifth diffractive mode, the diagonal edges at the plus angle of each group form steps. Since the diagonal edges at the plus angle are parallel to each other and the steps lie in the same plane, the diagonal edges at the plus angle form a periodicity. As shown in FIG. 7A, the direction of the periodicity, while in the fifth diffraction mode, is perpendicular to the diagonal edges at the plus angle of the elongated elements 15. While in the fifth diffraction mode, light is diffracted similarly as in the third diffraction mode, except that the diffracted light is directed along a fourth diffraction plane 50.

Figure 7C:
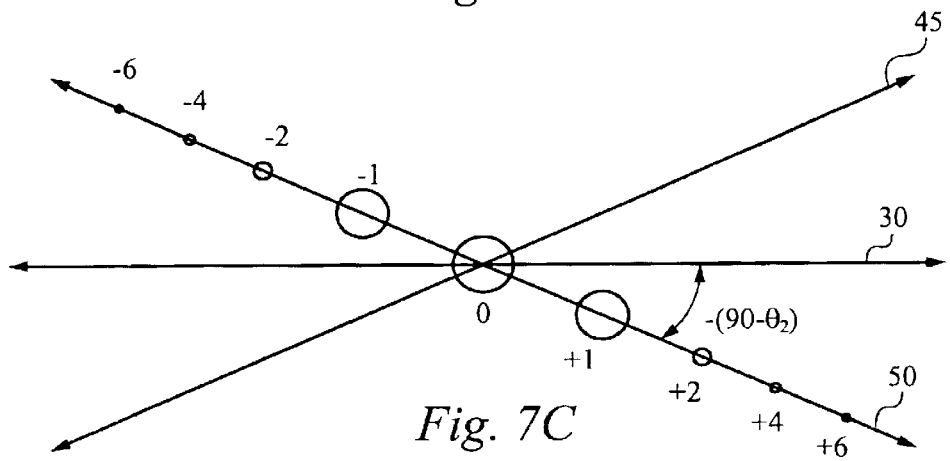
FIG. 7C illustrates an exemplary diffraction pattern along a fourth diffraction plane while in the fifth diffraction mode.

FIG. 7C illustrates an exemplary diffraction pattern along the fourth diffraction plane 50 while in the fifth diffraction mode. The diffraction pattern illustrated in FIG. 7C is similar to that illustrated in FIG. 5C related to the third diffraction mode, except that the diffraction pattern of the fifth diffraction mode is directed along the fourth diffraction plane 50. If the diagonal edge at the plus angle is formed at an angle −θ2 (FIG. 5A) to the diffraction plane 30, then the fourth diffraction plane 50 lies at an angle −(90−θ2) (FIG. 7C) to the diffraction plane 30.

The second embodiment of the diffractive light modulator 13 can be used as a 1×4 switch. In this case, the zero order light is collected as the output of a first output port, the first order light in the diffraction plane 30 is collected as the output of a second output port, the first order light in the diffraction plane 45 is collected as the output of a third output port, and the first order light in the diffraction plane 50 is collected as the output of a fourth output port. Preferably, only the plus first order light or the minus first order light is collected along the diffraction plane 30 for the second output port, only the plus first order light or the minus first order light is collected along the diffraction plane 45 for the third output port, and only the plus first order light or the minus first order light is collected along the diffraction plane 50 for the fourth output port. Alternatively, both the plus and minus first order light is collected along the diffraction plane 30 for the second output port, both the plus and minus first order light is collected along the diffraction plane 45 for the third output port, and both the plus and minus first order light is collected along the diffraction plane 50 for the fourth output port.

Although it is preferred that the second edges are diagonal within the active optical area, it is understood that the second edges can be diagonal over a length larger than the active optical area, up to the entire length of the elongated element. It is preferable that the diagonal edge is made within the active optical area to enable use of smaller angles θ from the diffraction plane 30. To clarify, since the length of the elongated elements 15 is large relative to the width, a diagonal edge along the entire length of the elongated element 15 is only marginally less than 90 degrees from the diffraction plane 30. Such a large angle only rotates the diffraction plane by a correspondingly small degree from the diffraction plane 30. A smaller angle rotates the diffraction plane by a correspondingly larger degree, which produces better de-coupling of the diffracted light in the two diffraction planes.

It is understood that although the first edge is preferably a straight edge parallel to the lengthwise axis of the elongated elements 15, the first edge can be a linear edge at an angle to the lengthwise axis. The first edge and the second edge are at different angles to the lengthwise axis in order to produce different diffraction planes when in operation.

FIGS. 2B, 3B, and 4B depict the first embodiment of the diffractive light modulator 13 in the reflection mode, first diffraction mode, and second diffraction mode, respectively. For a deflection of the alternate groups of the elongated elements 15 of less than a quarter wavelength $\lambda/4$, the incident light I both reflects and diffracts producing the reflected light R and the diffracted light including the plus one and minus one diffraction orders, D+1 and D−1. In other words, by deflecting the alternate groups of the elongated elements less the quarter wavelength $\lambda/4$, the diffractive light modulator 13 produces a variable reflectivity. By varying the reflectivity in this manner, each incident light can be equalized to a specified intensity. It should be born in mind that terms like "equalize" and "equalization" as used with respect to the present invention are to be broadly interpreted with respect to regulating the power levels of component light signals to any pre-determined level of relative power levels. Accordingly, the term "equalize" as used herein is not to be limited to any one particular curve or ratio, but simply constitutes a regulation or normalization of signal power against any pre-determined curve or ratio of power levels at different frequencies. It is understood that other embodiments, including the second embodiment, of the present invention can also produce a variable reflectivity.

In the case of the first embodiment, the diffractive light modulator 13 can also be used for switching and attenuating. When used solely as a switch, light is directed into output port 1, 2 or 3, as described above. When used as a switch and attenuator, one of the output ports, say output port 3, is used as a "throw away" port to direct attenuated light. For example, an input signal (incident light I) is to be switched to port 2 and equalized to a level 90% of its input level. To switch and attenuate the input signal, 90% of the input signal is directed by diffraction to output port 2 while 10% of the input signal is directed by diffraction to output port 3. Since output port 3 is not collected as a switched output port, the 10% portion of the input signal directed to output port 3 is effectively "thrown away."

Figure 8A:
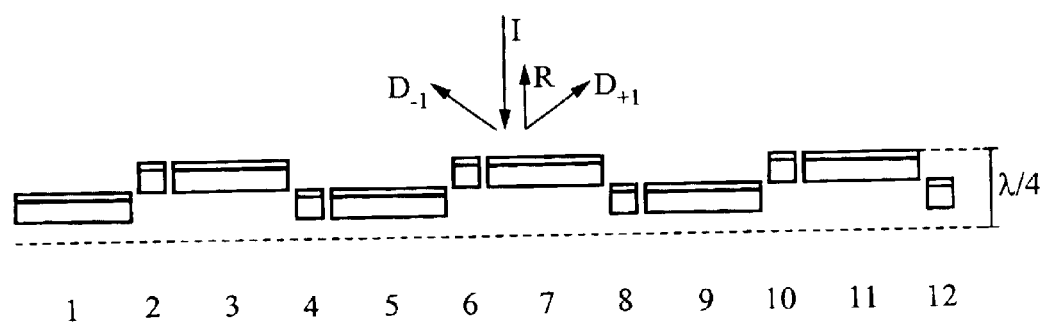
FIG. 8A illustrates a first example of a 1×2 switch and attenuation application of the diffractive light modulator according to the first embodiment of the present invention.

FIG. 8A illustrates a first example of a 1×2 switch and attenuation application of the diffractive light modulator 13 according to the first embodiment of the present invention. In this case, output port 1 (collected zero order light) and output port 2 (collected plus first order light in diffraction plane 30) are switching ports, and output port 3 (plus first order light in diffraction plane 40) is a throw away port. The configuration of the elongated elements 15 in FIG. 8A is similar to the configuration in FIG. 4B such that any diffracted light is diffracted along the diffraction plane 40. In FIG. 8A however, the ribbons 1, 4, 5, 8, 9, and 12 are not moved into the maximum diffraction position of $\lambda/4$. The ribbons 1, 4, 5, 8, 9, and 12 in FIG. 8A are configured for variable reflectivity, and therefore, only diffract a portion of the incident light I into the diffraction plane 40. In this manner, an input signal (incident light I in FIG. 8A) is switched to port 1 (reflected light R in FIG. 8A) and a portion of the input signal is attenuated and thrown away at the output port 3 (diffracted light D+1 in FIG. 8A). The configuration of the elongated elements 15 shown in FIG. 8A creates a superposition of reflected light in the diffraction plane 30, and the diffraction pattern in the diffraction plane 40. The net result is attenuated light at the output port 1.

Figure 8B:
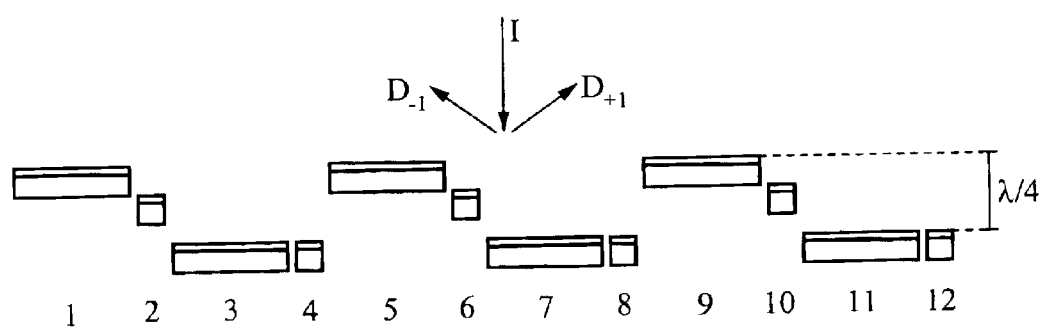
FIG. 8B illustrates a second example of a 1×2 switch and attenuation application of the diffractive light modulator according to the first embodiment of the present invention.

FIG. 8B illustrates a second example of a 1×2 switch and attenuation application of the diffractive light modulator 13 according to the first embodiment of the present invention. In this case, output port 1 (collected zero order light) and output port 2 (collected plus first order light in diffraction plane 30) are switching ports, and output port 3 (collected plus first order light in diffraction plane 40) is a throw away port. The configuration of the elongated elements 15 in FIG. 8B is similar to the configuration in FIG. 3B in that ribbons 3, 4, 7, 8, 11, and 12 are moved to maximum diffraction position to diffract light along the diffraction plane 30. In FIG. 8B, however, the ribbons 2, 6, and 10 are also moved which creates a periodicity corresponding to the diffraction plane 40. This periodicity creates diffraction along the diffraction plane 40. In this manner, an input signal (incident light I in FIG. 8B) is switched to port 2 (diffracted light D+1 in FIG. 8B) and a portion of the input signal is attenuated and thrown away at the output port 3 (not shown in FIG. 8B). The configuration of the elongated elements 15 shown in FIG. 8B creates a superposition of diffraction patterns in both the diffraction plane 30 and the diffraction plane 40. The net result is attenuated light at the output port 2. Similarly, the second embodiment of the diffractive light modulator can be used as a 1×3 switch and attenuator.

Figure 9:
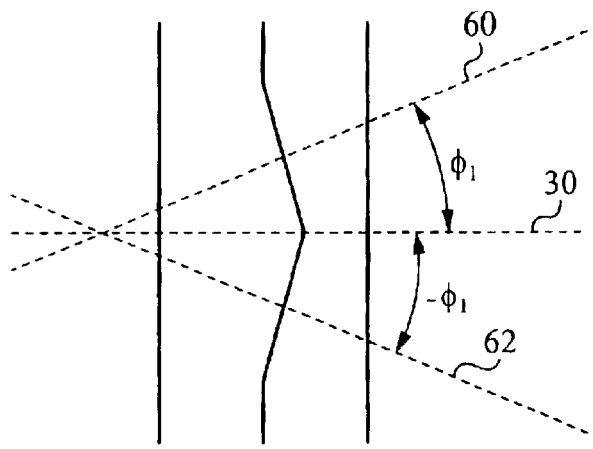
FIG. 9 illustrates a single saw-tooth edge pattern for the elongated elements.
Figure 10:
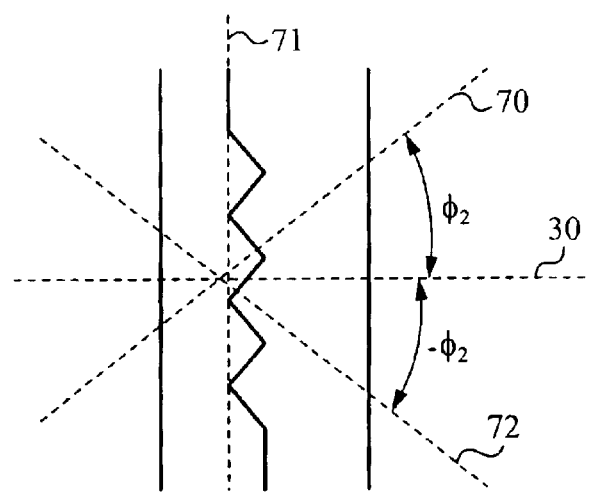
FIG. 10 illustrates a saw-tooth edge pattern for the elongated elements.
Figure 11:
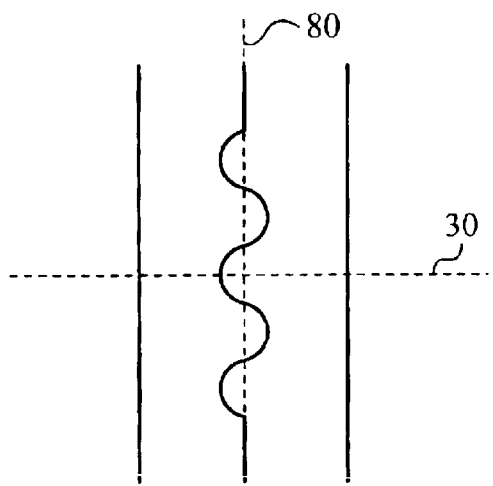
FIG. 11 illustrates a sinusoid edge pattern for the elongated elements.

The edges of the elongated elements 15 are not restricted to a single linear 5 direction, as in the straight edge or the diagonal edge. FIGS. 9–11 illustrate exemplary edge patterns for the elongated elements 15. The edge patterns illustrated in FIGS. 9–11 are preferably used in attenuation applications. Alternatively, these edge patterns can be used for switching and attenuation applications. FIG. 9 illustrates a single saw-tooth edge pattern. In a diffraction mode where the single saw-tooth forms the outer edges of a group, two additional dimensions of periodicity exist, one according to each side of the saw-tooth. The three dimensions of periodicity form three simultaneous diffraction planes 30, 60 and 62. In the case where the saw-tooth forms an isosceles triangle with the lengthwise axis of the elongated element 15, the diffraction plane 60 is formed at an angle φ1 to the diffraction plane 30, and the diffraction plane 62 is formed at an angle −φ1 to the diffraction plane 30. In the diffraction mode, where the ribbons are deflected to form a step at the saw-tooth edge, light is diffracted along diffraction planes 30, 60 and 62.

FIG. 10 illustrates a saw-tooth pattern. In a diffraction mode where the saw-tooth pattern forms the outer edges of a group, the saw-tooth pattern in FIG. 10 forms three simultaneous diffraction planes 70, 71 and 72. In the case where each saw-tooth in the saw-tooth pattern forms an isosceles triangle with the lengthwise axis of the elongated element 15, the diffraction plane 70 is formed at an angle φ2 to the diffraction plane 30, and the diffraction plane 72 is formed at an angle −φ2 to the diffraction plane 30. The diffraction plane 71 is formed perpendicular to the diffraction plane 30. Due to the higher frequency of the saw-tooths in FIG. 10 as compared to FIG. 9, the angle φ2 is greater than φ1. In the diffraction mode, light is diffracted along diffraction planes 70, 71 and 72.

FIG. 11 illustrates a sinusoid edge pattern. In a diffraction mode where the sinusoid pattern forms the outer edges of a group, the sinusoid pattern provides an additional periodicity in a direction parallel to the lengthwise axis of the elongated element 15, and therefore forms an additional diffraction plane 80 perpendicular to the diffraction plane 30.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A light modulator comprising:
   a. elongated elements arranged in parallel wherein each element includes a light reflective planar surface; and
   b. a support structure coupled to the elongated elements to maintain a position of the elongated elements relative to each other and to enable movement of each elongated element between a first modulator configuration wherein the elongated elements act to reflect an incident light as a plane mirror, and a second modulator configuration wherein selected groups of elements are deflected and act to diffract the incident light along one or more of a plurality of diffraction planes, wherein the groups of elements are configured according to one of a plurality of selectable group configurations, each group configuration corresponding to one of the plurality of diffraction planes.

2. The light modulator according to claim 1 wherein each element further comprises a first edge and a second edge such that in an active optical area the first edge is linear and is formed at a first edge angle relative to a lengthwise axis of the elongated element and the second edge is linear and is formed at a second edge angle relative to the lengthwise axis of the elongated element.

3. The light modulator according to claim 2 wherein the first edge angle is zero and the second edge angle is non-zero.

4. The light modulator according to claim 2 wherein each group configuration includes at least two adjacent elements such that one of the first edge and the second edge of a first end element of the group configuration forms a first outer group edge, and one of the first edge and the second edge of a second end element of the group configuration forms a second outer group edge, wherein the edge angles of the first and second outer group edges are the same.

5. The light modulator according to claim 4 wherein alternating groups of elements are deflected a distance of about one-quarter the wavelength of the incident light thereby diffracting the incident light along a first diffraction plane perpendicular to the outer group edge.

6. The light modulator according to claim 5 wherein one or more elements of each group of a remaining group of elements are deflected a distance within a range of about zero to about one-quarter the wavelength of the incident light thereby diffracting a portion of the incident light along a second diffraction plane perpendicular to a non-deflected element edge nearest the one or more elements.

7. The light modulator according to claim 4 wherein a selectable diffraction plane is formed perpendicular to the outer group edge of each group configuration.

8. The light modulator according to claim 1 wherein the light modulator comprises a diffractive light modulator.

9. The light modulator according to claim 8 wherein the diffractive light modulator comprises a grating light valve.

10. The light modulator according to claim 1 wherein each element further comprises a first conductive element and the light modulator further comprises a substrate coupled to the support structure, the substrate comprising a second conductive element such that in operation an electrical bias applied between the first conductive element and the second conductive element enables movement of each of the elements.

11. The light modulator according to claim 1 wherein each element further comprises a first edge and a second edge such that in an active optical area the first edge is linear and parallel to a lengthwise axis of the element, and the second edge forms a non-linear pattern.

12. The light modulator according to claim 11 wherein the non-linear pattern is a saw-tooth pattern.

13. The light modulator according to claim 12 wherein the saw-tooth pattern is a single saw-tooth.

14. The light modulator according to claim 11 wherein the non-linear pattern is sinusoidal.

15. A method of modulating light comprising:
 a. supporting a plurality of elongated elements arranged in parallel, each element including a light reflective planar surface; and
 b. configuring the plurality of elongated elements between a first modulator configuration wherein the elongated elements act to reflect an incident light as a plane mirror, and a second modulator configuration wherein selected groups of elements are deflected and act to diffract the incident light along one or more of a plurality of diffraction planes, wherein the groups of elements are configured according to one of a plurality of selectable group configurations, each group configuration corresponding to one of the plurality of diffraction planes.

16. The method according to claim 15 wherein each element further comprises a first edge and a second edge such that in an active optical area the first edge is linear and is formed at a first edge angle relative to a lengthwise axis of the elongated element and the lengthwise axis of the elongated element.

17. The method according to claim 16 wherein the first edge angle is zero and the second edge angle in non-zero.

18. The method according to claim 15 wherein alternating groups of elongated elements are deflected a distance of about one-quarter the wavelength of the incident light thereby diffracting the incident light along a first diffraction plane perpendicular to the first and second outer group edges.

19. The method according to claim 18 wherein one or more elements of each group of a remaining groups of elements are deflected a distance within a range of about zero to about one-quarter the wavelength of the incident light thereby diffracting a portion of the incident light along a second diffraction plane perpendicular to a non-deflected element edge nearest the one or more elements.

20. A light modulator comprising:
 a. means for supporting a plurality of elongated elements arranged in parallel, each element including a light reflective planar surface; and
 b. means for configuring the plurality of elongated elements between a first modulator configuration wherein the elongated elements act to reflect an incident light as a plane mirror, and a second modulator configuration wherein selected groups of elements are deflected and act to diffract the incident light along one or more of a plurality of diffraction planes, wherein the groups of elements are configured according to one of a plurality of selectable group configurations, each group configuration corresponding to one of the plurality of diffraction planes.

* * * * *